(12) United States Patent
Lewis-Bowen et al.

(10) Patent No.: US 7,519,917 B2
(45) Date of Patent: Apr. 14, 2009

(54) METHOD AND APPARATUS FOR GRAPHICALLY DISPLAYING COMPATIBLE WORKFLOW STEPS

(75) Inventors: Alister D. Lewis-Bowen, Cambridge, MA (US); Sean J. Martin, Webster, MA (US); Simon L. Martin, Hursey (GB); Rouben Meschian, Boston, MA (US); Matthew N. Roy, Brookline, MA (US); Dan Smith, Stevens Point, WI (US); Benjamin H. Szekely, Boston, MA (US); Elias J. Torres, Lowell, MA (US); Louis M. Weitzman, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 11/324,964

(22) Filed: Jan. 3, 2006

(65) Prior Publication Data
US 2007/0157088 A1    Jul. 5, 2007

(51) Int. Cl.
*G06F 3/048* (2006.01)

(52) U.S. Cl. .................... 715/772; 715/771; 715/965; 715/966; 715/967; 714/21

(58) Field of Classification Search .............. 715/965, 715/966, 967, 771, 772; 714/21
See application file for complete search history.

(56) References Cited

U.S. PATENT DOCUMENTS

| 5,422,993 | A | | 6/1995 | Fleming |
| 5,761,656 | A | | 6/1998 | Ben-Shachar |
| 5,999,911 | A | * | 12/1999 | Berg et al. ..................... 705/9 |
| 6,157,934 | A | * | 12/2000 | Khan et al. ................. 715/234 |
| 6,243,092 | B1 | * | 6/2001 | Okita et al. ................. 715/866 |
| 6,353,452 | B1 | | 3/2002 | Hamada et al. |
| 6,490,634 | B2 | | 12/2002 | Coiner |

(Continued)

OTHER PUBLICATIONS

National Instruments, LabVIEW: User Manual, Apr. 2003 Edition, pp. 1-1, 5-6, 5-7, 5-12, 5-13, 5-15, 5-26.*

(Continued)

*Primary Examiner*—Weilun Lo
*Assistant Examiner*—Tuyetlien T Tran
(74) *Attorney, Agent, or Firm*—John E. Campbell; Jon A. Gibbons; Fleit Gibbons Gutman Bongini & Bianco P.L.

(57) ABSTRACT

A method, apparatus, and computer program product for graphically presenting compatible workflow steps to a user through a graphical user interface are disclosed. The method includes graphically displaying a plurality of steps in a workflow. A user's selection for at least one step in a plurality of steps to denote at least one selected step and at least one non-selected step is received. The method further includes determining if a set of one or more output parameters of the selected step is acceptable as an input of the non-selected step. An appearance of the non-selected step is graphically changed if the output parameters are acceptable. The method also includes determining if a set of one or more output parameters of the non-selected step is acceptable as an input of the selected step. An appearance of the non-selected step is graphically changed if the output parameters are acceptable.

4 Claims, 21 Drawing Sheets

U.S. PATENT DOCUMENTS

| | | | |
|---|---|---|---|
| 6,535,930 | B2 | 3/2003 | Stern et al. |
| 6,564,368 | B1 | 5/2003 | Beckett et al. |
| 6,662,237 | B1 | 12/2003 | Leckie |
| 6,728,947 | B1* | 4/2004 | Bengston .................... 717/103 |
| 2004/0216149 | A1 | 10/2004 | Reitz et al. |
| 2005/0015732 | A1 | 1/2005 | Vedula et al. |
| 2005/0243365 | A1* | 11/2005 | Noda ........................ 358/1.15 |
| 2007/0067425 | A1* | 3/2007 | McKinney .................. 709/223 |

OTHER PUBLICATIONS

Franklin, S.M., "Dynamic Object Pair Validation," IBM Technical Disclosure Bulletin, DA889-0336 JHB, vol. 33, No. 1B, Jun. 1990.

Fitzpatrick, G., Haynes, T., "Double-Click Manipulation to Override Defaults,"IBM Technical Disclosure Bulletin, DA892-0177 JHB, vol. 35, No. 7, Dec. 1992.

Johnson, K.D., Mills, A.R., Morgan, S.A., "Providing Visual and Audible Extensions to Enhanced Drag/Drop Paradigm," IBM Technical Disclosure Bulletin, AT894-0609 MSW, vol. 38, No. 2, Feb. 1995.

Gest, S.B., "Drop Site Catalog for Leading the User through the Drag and Drop Process," IBM Technical Disclosure Bulletin, AT894-0776 MSW, vol. 38, No. 8, Aug. 1995.

Gest, S.B., "Enhanced Icon for Leading User through Drag and Drop Process," IBM Technical Disclosure Bulletin, AT894-0340 JSL, vol. 39, No. 3, Mar. 1996.

* cited by examiner

```
1   # This document contains an example workflow instance that comprises the addition of
2   two numbers, and then the multiplication of the result
3   # by a third number. (n1 + n2) * n3. Comments are indicated by # at the beginning of
4   the line. Others, each line
5   # is of the form: <subject> <predicate> <object>. The terms predicate and property may
6   be used interchangeably.
7
8   # Part of the structure of the workflow RDF is standard OWL-S. Other parts, the
9   workflow and grounding details
10  # in particular were added by us to enabled the emobidment of the invention. These will
11  be denoted by the comment '#@'.
12
13  # Statements containing the predicate <http://www.w3.org/1999/02/22-rdf-syntax-
14  ns#type> indicate the object type of the subject resource. In RDF,
15  # resources may be of as many types as needed. Certain types are defined in OWL-S,
16  other types we created to enable our embodiment. Such types
17  # will be proceded by the '#@' indicator
18
19  # the URIs for subjects were chosen in a somewhat adhoc manner when building the
20  demo. Hopefully they aren't too confusing.
21
22  # The first group of statements describe the root workflow resource
23  # the describedBy predicate points to the real structure of the workflow, included below.
24  <workflow:mathsequence> <http://www.daml.org/services/owl-
25  s/1.1/Service.owl#describedBy> <cp:cp1> .
26  #@ The status predicate stores the status of the workflow (ready/running/complete)
27  <workflow:mathsequence> <urn:lsid:lsid.ibm.com:2005-06-workflow:status>
28  "ready"^^<http://www.w3.org/2001/XMLSchema#string> ..
29  # Groundings are the part of the workflow that describe how a particular step or
30  collection of steps is to be executed.
31  # The groundings also contain the input and output values of the steps. The groundings
32  themselves, described in detail below
33  # must be referenced by the root workflow resource.
34  <workflow:mathsequence> <http://www.daml.org/services/owl-
35  s/1.1/Service.owl#supports> <bg:cpg> .
36  <workflow:mathsequence> <http://www.daml.org/services/owl-
37  s/1.1/Service.owl#supports> <http://objs#bgrounding> .
38  <workflow:mathsequence> <http://www.daml.org/services/owl-
39  s/1.1/Service.owl#supports> <http://objs#agrounding> .
40  #@ - objects that have a status
41  <workflow:mathsequence> <http://www.w3.org/1999/02/22-rdf-syntax-ns#type>
42  <urn:lsid:lsid.ibm.com:2005-06-workflow:StatusObject> .
43  # - service is the OWL-S top-level object.
44  <workflow:mathsequence> <http://www.w3.org/1999/02/22-rdf-syntax-ns#type>
45  <http://www.daml.org/services/owl-s/1.1/Service.owl#Service> .
46  #@ - objects that are workflows that slingshot can execute
```

*FIG. 3A*

```
1   <workflow:mathsequence> <http://www.w3.org/1999/02/22-rdf-syntax-ns#type>
2   <urn:lsid:lsid.ibm.com:2005-06-workflow:SlingshotWorkflow>
3
4
5   # At most basic level, OWL-S workflow is structured with atomic and composite
6   processes. A composite process has a control construct that
7   # determines how its child processes are executed (sequentially, in parallel, conditionally,
8   etc...). Control constructs and composite processes
9   # may be nested.
10
11  # A composite process is a ServiceModel so it can be the object of the describedBy
12  statement above. By inheritance, it is also a Process.
13  <cp:cp1> <http://www.w3.org/1999/02/22-rdf-syntax-ns#type>
14  <http://www.daml.org/services/owl-s/1.1/Service.owl#ServiceModel> .
15  <cp:cp1> <http://www.w3.org/1999/02/22-rdf-syntax-ns#type>
16  <http://www.daml.org/services/owl-s/1.1/Process.owl#Process> .
17  <cp:cp1> <http://www.w3.org/1999/02/22-rdf-syntax-ns#type>
18  <http://www.daml.org/services/owl-s/1.1/Process.owl#CompositeProcess> .
19  # A composite process provides an single-process abstraction around its child processes
20  and control constructs, and thus it exposes inputs
21  # and outputs of its own. This allows multiple workflows to share composite processes.
22  <cp:cp1> <http://www.daml.org/services/owl-s/1.1/Process.owl#hasInput> <input:cpb> .
23  <cp:cp1> <http://www.daml.org/services/owl-s/1.1/Process.owl#hasInput> <input:cpa> .
24  <cp:cp1> <http://www.daml.org/services/owl-s/1.1/Process.owl#hasOutput>
25  <output:cpc> .
26  # The result specifies which child process(es) the output(s) of the composite come from.
27  <cp:cp1> <http://www.daml.org/services/owl-s/1.1/Process.owl#hasResult> <result:res>
28
29  # The composedOf property specifies the control construct containing the child
30  processes. In this case,
31  # we have a sequence of mathematical operations (desribed below)
32  <cp:cp1> <http://www.daml.org/services/owl-s/1.1/Process.owl#composedOf>
33  <seq:seq1> .
34
35  # The Perform of a composite process is used to connect a composite process to its
36  grounding (see grounding section below)
37  <perf:cp> <http://www.w3.org/1999/02/22-rdf-syntax-ns#type>
38  <http://www.daml.org/services/owl-s/1.1/Process.owl#ControlConstruct> .
39  <perf:cp> <http://www.w3.org/1999/02/22-rdf-syntax-ns#type>
40  <http://www.daml.org/services/owl-s/1.1/Process.owl#Perform> .
41  <perf:cp> <http://www.daml.org/services/owl-s/1.1/Process.owl#process> <cp:cp1> .
42
43
44  # inputs and outputs of the composite process. These will have to wired to and from the
45  inputs and outputs of the child
46  # processes, described below
```

*FIG. 3B*

```
1   <input:cpa> <http://www.w3.org/1999/02/22-rdf-syntax-ns#type>
2   <http://www.daml.org/services/owl-s/1.1/Process.owl#Input> .
3   <input:cpa> <http://www.w3.org/1999/02/22-rdf-syntax-ns#type>
4   <http://www.daml.org/services/owl-s/1.1/Process.owl#Parameter> .
5   <input:cpa> <http://www.w3.org/1999/02/22-rdf-syntax-ns#type>
6   <http://www.w3.org/2003/11/swrl#Variable> .
7   <input:cpb> <http://www.w3.org/1999/02/22-rdf-syntax-ns#type>
8   <http://www.daml.org/services/owl-s/1.1/Process.owl#Input> .
9   <input:cpb> <http://www.w3.org/1999/02/22-rdf-syntax-ns#type>
10  <http://www.daml.org/services/owl-s/1.1/Process.owl#Parameter> .
11  <input:cpb> <http://www.w3.org/1999/02/22-rdf-syntax-ns#type>
12  <http://www.w3.org/2003/11/swrl#Variable> .
13  <output:cpc> <http://www.w3.org/1999/02/22-rdf-syntax-ns#type>
14  <http://www.daml.org/services/owl-s/1.1/Process.owl#Parameter> .
15  <output:cpc> <http://www.w3.org/1999/02/22-rdf-syntax-ns#type>
16  <http://www.w3.org/2003/11/swrl#Variable> .
17  <output:cpc> <http://www.w3.org/1999/02/22-rdf-syntax-ns#type>
18  <http://www.daml.org/services/owl-s/1.1/Process.owl#Output> .
19
20
21
22  <seq:seq1> <http://www.w3.org/1999/02/22-rdf-syntax-ns#type>
23  <http://www.daml.org/services/owl-s/1.1/Process.owl#ControlConstruct> .
24  <seq:seq1> <http://www.w3.org/1999/02/22-rdf-syntax-ns#type>
25  <http://www.daml.org/services/owl-s/1.1/Process.owl#Sequence> .
26  # The sequence object itself points to a list of processes.
27  <seq:seq1> <http://www.daml.org/services/owl-s/1.1/Process.owl#components>
28  <ccl:ccl1> .
29
30  # The list of components is a list child control constructs. Each control construct i the list
31  can be another control constructs or a
32  # "perform" which indicates a process to execute. In this case, the list has two performs,
33  a1 and b1 which indicates that a1 should be
34  # performed, then b1. The structure of the list itself is a bit complicated because there is
35  no order inherant in RDF. Therefore a
36  # linked-list approach must be used.
37  <ccl:ccl1> <http://www.w3.org/1999/02/22-rdf-syntax-ns#type>
38  <http://www.daml.org/services/owl-s/1.1/generic/ObjectList.owl#List> .
39  <ccl:ccl1> <http://www.daml.org/services/owl-s/1.1/generic/ObjectList.owl#first>
40  <perf:a1> .
41  <ccl:ccl1> <http://www.w3.org/1999/02/22-rdf-syntax-ns#type>
42  <http://www.daml.org/services/owl-s/1.1/Process.owl#ControlConstructList> .
43  <ccl:ccl1> <http://www.daml.org/services/owl-s/1.1/generic/ObjectList.owl#rest>
44  <ccl:ccl2> .
45  <ccl:ccl2> <http://www.daml.org/services/owl-s/1.1/generic/ObjectList.owl#rest>
46  <http://www.w3.org/1999/02/22-rdf-syntax-ns#nil> .
```

*FIG. 3C*

```
1   <ccl:ccl2> <http://www.w3.org/1999/02/22-rdf-syntax-ns#type>
2   <http://www.daml.org/services/owl-s/1.1/Process.owl#ControlConstructList> .
3   <ccl:ccl2> <http://www.daml.org/services/owl-s/1.1/generic/ObjectList.owl#first>
4   <perf:b1> .
5   <ccl:ccl2> <http://www.w3.org/1999/02/22-rdf-syntax-ns#type>
6   <http://www.daml.org/services/owl-s/1.1/generic/ObjectList.owl#List> .
7
8   # The perform connects an actual process to a control construct, as above. The perform,
9   of course, specifies the process to
10  # be performed. It also specifies bindings viathe hasDataFrom property. A binding
11  specifies which other process+output the data for a particualar
12  # input of the given process should come from. The details of the bindings are below. A
13  binding must be supplied for each input that
14  # does not have the value pre-suplied by the creator of the workflow (see grounding
15  definitions below). This perform contains the adder
16  # process and has bindings for both inputs, a and b.
17  <perf:a1> <http://www.w3.org/1999/02/22-rdf-syntax-ns#type>
18  <http://www.daml.org/services/owl-s/1.1/Process.owl#Perform> .
19  <perf:a1> <http://www.daml.org/services/owl-s/1.1/Process.owl#hasDataFrom>
20  <binding:b> .
21  <perf:a1> <http://www.daml.org/services/owl-s/1.1/Process.owl#hasDataFrom>
22  <binding:a> .
23  <perf:a1> <http://www.daml.org/services/owl-s/1.1/Process.owl#process>
24  <http://objs#adder> .
25  <perf:a1> <http://www.w3.org/1999/02/22-rdf-syntax-ns#type>
26  <http://www.daml.org/services/owl-s/1.1/Process.owl#ControlConstruct> .
27
28  # This perform contains the multiplier process but contains only a single binding.
29  Therefore, the second input to the multiplier
30  # will be supplied directly in the grounding below.
31  <perf:b1> <http://www.w3.org/1999/02/22-rdf-syntax-ns#type>
32  <http://www.daml.org/services/owl-s/1.1/Process.owl#ControlConstruct> .
33  <perf:b1> <http://www.daml.org/services/owl-s/1.1/Process.owl#hasDataFrom>
34  <binding:mul> .
35  <perf:b1> <http://www.daml.org/services/owl-s/1.1/Process.owl#process>
36  <http://objs#multiplier> .
37  <perf:b1> <http://www.w3.org/1999/02/22-rdf-syntax-ns#type>
38  <http://www.daml.org/services/owl-s/1.1/Process.owl#Perform> .
39
40  # The binding specifies the parameter (toParam) to pass the value to. It also points to a
41  valueSource which is where the
42  # value of the input should come from. In this case, it comes from the input of the
43  ParentPerform which essential indicates
44  # that we should get the value from the input to the composite process that contains us.
45  The is how the input of a composite
```

*FIG. 3D*

```
1   # expose the inputs of its child processes. The rdf:type statements are missing from the
2   valueSources.
3   <binding:a> <http://www.w3.org/1999/02/22-rdf-syntax-ns#type>
4   <http://www.daml.org/services/owl-s/1.1/Process.owl#InputBinding> .
5   <binding:a> <http://www.daml.org/services/owl-s/1.1/Process.owl#valueSource>
6   <http://testanon1> .
7   <binding:a> <http://www.daml.org/services/owl-s/1.1/Process.owl#toParam>
8   <http://objs#adderinputa> .
9   <binding:a> <http://www.w3.org/1999/02/22-rdf-syntax-ns#type>
10  <http://www.daml.org/services/owl-s/1.1/Process.owl#Binding> .
11  <http://testanon1> <http://www.daml.org/services/owl-s/1.1/Process.owl#fromProcess>
12  <http://www.daml.org/services/owl-s/1.1/Process.owl#TheParentPerform> .
13  <http://testanon1> <http://www.daml.org/services/owl-s/1.1/Process.owl#theVar>
14  <input:cpa> .
15
16
17  # same as binding:a
18  <binding:b> <http://www.w3.org/1999/02/22-rdf-syntax-ns#type>
19  <http://www.daml.org/services/owl-s/1.1/Process.owl#InputBinding> .
20  <binding:b> <http://www.w3.org/1999/02/22-rdf-syntax-ns#type>
21  <http://www.daml.org/services/owl-s/1.1/Process.owl#Binding> .
22  <binding:b> <http://www.daml.org/services/owl-s/1.1/Process.owl#toParam>
23  <http://objs#adderinputb> .
24  <binding:b> <http://www.daml.org/services/owl-s/1.1/Process.owl#valueSource>
25  <http://testanon2> .
26  <http://testanon2> <http://www.daml.org/services/owl-s/1.1/Process.owl#fromProcess>
27  <http://www.daml.org/services/owl-s/1.1/Process.owl#TheParentPerform> .
28  <http://testanon2> <http://www.daml.org/services/owl-s/1.1/Process.owl#theVar>
29  <input:cpb> .
30
31  # the binding for the multiplier perform has a valueSource that points to the previous
32  process in the sequence (adder) as apposed to the ParentPerform.
33  <binding:mul> <http://www.daml.org/services/owl-s/1.1/Process.owl#valueSource>
34  <http://testanon3> .
35  <binding:mul> <http://www.w3.org/1999/02/22-rdf-syntax-ns#type>
36  <http://www.daml.org/services/owl-s/1.1/Process.owl#Binding> .
37  <binding:mul> <http://www.daml.org/services/owl-s/1.1/Process.owl#toParam>
38  <http://objs#multiplierinputa> .
39  <binding:mul> <http://www.w3.org/1999/02/22-rdf-syntax-ns#type>
40  <http://www.daml.org/services/owl-s/1.1/Process.owl#InputBinding> .
41  <http://testanon3> <http://www.daml.org/services/owl-s/1.1/Process.owl#fromProcess>
42  <perf:a1> .
43  <http://testanon3> <http://www.daml.org/services/owl-s/1.1/Process.owl#theVar>
44  <http://objs#adderoutputc> .
45
```

*FIG. 3E*

```
1   # The result of is used to specify where the output of a composite process comes from.
2   Since the composite process itself does no work itself
3   # it essentially exposes its child processes' ouputs as ouputs of its own. In our case, the
4   composite process containing the
5   # adder->multiplier sequence takes its single output from the output of the multiplier
6   process .
7   <result:res> <http://www.w3.org/1999/02/22-rdf-syntax-ns#type>
8   <http://www.daml.org/services/owl-s/1.1/Process.owl#Result> .
9   <result:res> <http://www.daml.org/services/owl-s/1.1/Process.owl#withOutput>
10  <binding:out> .
11  <result:res> <http://www.daml.org/services/owl-s/1.1/Process.owl#inCondition>
12  <http://www.daml.org/services/owl-s/1.1/generic/Expression.owl#AlwaysTrue> .
13  <binding:out> <http://www.daml.org/services/owl-s/1.1/Process.owl#valueSource>
14  <http://testanon4> .
15  <binding:out> <http://www.w3.org/1999/02/22-rdf-syntax-ns#type>
16  <http://www.daml.org/services/owl-s/1.1/Process.owl#OutputBinding> .
17  <binding:out> <http://www.daml.org/services/owl-s/1.1/Process.owl#toParam>
18  <output:cpc> .
19  <binding:out> <http://www.w3.org/1999/02/22-rdf-syntax-ns#type>
20  <http://www.daml.org/services/owl-s/1.1/Process.owl#Binding> .
21  <http://testanon4> <http://www.daml.org/services/owl-s/1.1/Process.owl#fromProcess>
22  <perf:b1> .
23  <http://testanon4> <http://www.daml.org/services/owl-s/1.1/Process.owl#theVar>
24  <http://objs#multiplieroutputc> .
25
26  # The definition of the adderprocess has two inputs and a single output. A more
27  complete example might
28  # have other properties that describe the behavior of the process to consumers who might
29  want to include
30  # it in a workflow
31  <http://objs#adder> <http://www.daml.org/services/owl-s/1.1/Process.owl#hasInput>
32  <http://objs#adderinputa> .
33  <http://objs#adder> <http://www.daml.org/services/owl-s/1.1/Process.owl#hasInput>
34  <http://objs#adderinputb> .
35  <http://objs#adder> <http://www.daml.org/services/owl-s/1.1/Process.owl#hasOutput>
36  <http://objs#adderoutputc> .
37  <http://objs#adder> <http://www.w3.org/1999/02/22-rdf-syntax-ns#type>
38  <http://www.daml.org/services/owl-s/1.1/Service.owl#ServiceModel> .
39  <http://objs#adder> <http://www.w3.org/1999/02/22-rdf-syntax-ns#type>
40  <http://www.daml.org/services/owl-s/1.1/Process.owl#AtomicProcess> .
41  <http://objs#adder> <http://www.w3.org/1999/02/22-rdf-syntax-ns#type>
42  <http://www.daml.org/services/owl-s/1.1/Process.owl#Process> .
43  # The inputs and outputs could/should specify datatypes that would be used to determine
44  if two processes can be wired together in a
45  # user interface. In this example, we have only the type information
```

*FIG. 3F*

```
1   <http://objs#adderinputa> <http://www.w3.org/1999/02/22-rdf-syntax-ns#type>
2   <http://www.w3.org/2003/11/swrl#Variable> .
3   <http://objs#adderinputa> <http://www.w3.org/1999/02/22-rdf-syntax-ns#type>
4   <http://www.daml.org/services/owl-s/1.1/Process.owl#Parameter> .
5   <http://objs#adderinputa> <http://www.w3.org/1999/02/22-rdf-syntax-ns#type>
6   <http://www.daml.org/services/owl-s/1.1/Process.owl#Input> .
7   <http://objs#adderinputb> <http://www.w3.org/1999/02/22-rdf-syntax-ns#type>
8   <http://www.w3.org/2003/11/swrl#Variable> .
9   <http://objs#adderinputb> <http://www.w3.org/1999/02/22-rdf-syntax-ns#type>
10  <http://www.daml.org/services/owl-s/1.1/Process.owl#Parameter> .
11  <http://objs#adderinputb> <http://www.w3.org/1999/02/22-rdf-syntax-ns#type>
12  <http://www.daml.org/services/owl-s/1.1/Process.owl#Input> .
13  <http://objs#adderoutputc> <http://www.w3.org/1999/02/22-rdf-syntax-ns#type>
14  <http://www.daml.org/services/owl-s/1.1/Process.owl#Parameter> .
15  <http://objs#adderoutputc> <http://www.w3.org/1999/02/22-rdf-syntax-ns#type>
16  <http://www.w3.org/2003/11/swrl#Variable> .
17  <http://objs#adderoutputc> <http://www.w3.org/1999/02/22-rdf-syntax-ns#type>
18  <http://www.daml.org/services/owl-s/1.1/Process.owl#Output> .
19
20  # analagous to adder
21  <http://objs#multiplier> <http://www.daml.org/services/owl-s/1.1/Process.owl#hasInput>
22  <http://objs#multiplierinputa> .
23  <http://objs#multiplier> <http://www.daml.org/services/owl-s/1.1/Process.owl#hasInput>
24  <http://objs#multiplierinputb> .
25  <http://objs#multiplier> <http://www.daml.org/services/owl-
26  s/1.1/Process.owl#hasOutput> <http://objs#multiplieroutputc> .
27  <http://objs#multiplier> <http://www.w3.org/1999/02/22-rdf-syntax-ns#type>
28  <http://www.daml.org/services/owl-s/1.1/Process.owl#Process> .
29  <http://objs#multiplier> <http://www.w3.org/1999/02/22-rdf-syntax-ns#type>
30  <http://www.daml.org/services/owl-s/1.1/Service.owl#ServiceModel> .
31  <http://objs#multiplier> <http://www.w3.org/1999/02/22-rdf-syntax-ns#type>
32  <http://www.daml.org/services/owl-s/1.1/Process.owl#AtomicProcess> .
33  # analagous to adder
34  <http://objs#multiplierinputa> <http://www.w3.org/1999/02/22-rdf-syntax-ns#type>
35  <http://www.daml.org/services/owl-s/1.1/Process.owl#Parameter> .
36  <http://objs#multiplierinputa> <http://www.w3.org/1999/02/22-rdf-syntax-ns#type>
37  <http://www.w3.org/2003/11/swrl#Variable> .
38  <http://objs#multiplierinputa> <http://www.w3.org/1999/02/22-rdf-syntax-ns#type>
39  <http://www.daml.org/services/owl-s/1.1/Process.owl#Input> .
40  <http://objs#multiplierinputb> <http://www.w3.org/1999/02/22-rdf-syntax-ns#type>
41  <http://www.daml.org/services/owl-s/1.1/Process.owl#Input> .
42  <http://objs#multiplierinputb> <http://www.w3.org/1999/02/22-rdf-syntax-ns#type>
43  <http://www.daml.org/services/owl-s/1.1/Process.owl#Parameter> .
44  <http://objs#multiplierinputb> <http://www.w3.org/1999/02/22-rdf-syntax-ns#type>
45  <http://www.w3.org/2003/11/swrl#Variable> .
```

*FIG. 3G*

```
1   <http://objs#multiplieroutputc> <http://www.w3.org/1999/02/22-rdf-syntax-ns#type>
2   <http://www.daml.org/services/owl-s/1.1/Process.owl#Parameter> .
3   <http://objs#multiplieroutputc> <http://www.w3.org/1999/02/22-rdf-syntax-ns#type>
4   <http://www.daml.org/services/owl-s/1.1/Process.owl#Output> .
5   <http://objs#multiplieroutputc> <http://www.w3.org/1999/02/22-rdf-syntax-ns#type>
6   <http://www.w3.org/2003/11/swrl#Variable> .
7
8
9   # The remaining triples deal with the groundings of the atomic and composite processes.
10  The grounding are the portion of OWL-S that workflow
11  # designer are meant to extend in order to describe how their processes should be
12  executed. In the case of slingshot, the groundings
13  # of each atomic and composite process store the values of the inputs and outputs. The
14  grounding of the atomic processes only, contain
15  # information about who should invoke the process and as well as which participant
16  should invoke it.
17
18  # This is the grounding for the adder process
19  # the supports property indicates that this grounding determines how to run the adder
20  perform
21  <http://objs#agrounding> <urn:lsid:lsid.ibm.com:2005-06-workflow:supports> <perf:a1>
22
23  # the invokableClass is the Java Class used to invoke the process
24  <http://objs#agrounding> <urn:lsid:lsid.ibm.com:2005-06-workflow:invokableClass>
25  "com.ibm.slrp.slingshot.invokable.Adder"^^<http://www.w3.org/2001/XMLSchema#stri
26  ng> .
27  # the location of the participant to run the process
28  <http://objs#agrounding> <urn:lsid:lsid.ibm.com:2005-06-workflow:invokableLocation>
29  "urn:lsid:slingshot:local:location"^^<http://www.w3.org/2001/XMLSchema#string> .
30  # the status of the process, in this case, ready to run.
31  <http://objs#agrounding> <urn:lsid:lsid.ibm.com:2005-06-workflow:status>
32  "ready"^^<http://www.w3.org/2001/XMLSchema#string> .
33  # the inputs of the process, described below. The output will get added by the slingshot
34  engine when the process is run.
35  <http://objs#agrounding> <urn:lsid:lsid.ibm.com:2005-06-workflow:hasInput>
36  <http://gInputB> .
37  <http://objs#agrounding> <urn:lsid:lsid.ibm.com:2005-06-workflow:hasInput>
38  <http://gInputA> .
39  # supportedBy is on the only grounding property specified by OWL-S. This property
40  indicates the workflow this grounding is part of.
41  <http://objs#agrounding> <http://www.daml.org/services/owl-
42  s/1.1/Service.owl#supportedBy> <workflow:mathsequence> .
43  <http://objs#agrounding> <http://www.w3.org/1999/02/22-rdf-syntax-ns#type>
44  <http://www.daml.org/services/owl-s/1.1/Service.owl#ServiceGrounding> .
45  #@ All groundings with inputs and outputs are BaseGroundings
```

*FIG. 3H*

```
1    <http://objs#agrounding> <http://www.w3.org/1999/02/22-rdf-syntax-ns#type>
2    <urn:lsid:lsid.ibm.com:2005-06-workflow:BaseGrounding> .
3    #@ Invokable groundings are BaseGroundings with a location and invokableClass
4    <http://objs#agrounding> <http://www.w3.org/1999/02/22-rdf-syntax-ns#type>
5    <urn:lsid:lsid.ibm.com:2005-06-workflow:InvokableGrounding> .
6    #@ Groundings have a status
7    <http://objs#agrounding> <http://www.w3.org/1999/02/22-rdf-syntax-ns#type>
8    <urn:lsid:lsid.ibm.com:2005-06-workflow:StatusObject> .
9
10   # the correspondsTo property indicates the input of the process that this groundingInput
11   corresponds to. gInputA corresponds to the
12   # a inputof the adder processes. The processes is known implicitly based on the perform
13   the grounding is connected to.
14   # The value of this grounding input will be filled in from the value in the grounding of
15   the parent composite processes based on the wiring
16   # described above.
17   <http://gInputA> <urn:lsid:lsid.ibm.com:2005-06-workflow:correspondsTo>
18   <http://objs#adderinputa> .
19   <http://gInputA> <http://www.w3.org/1999/02/22-rdf-syntax-ns#type>
20   <urn:lsid:lsid.ibm.com:2005-06-workflow:Input> .
21   <http://gInputA> <http://www.w3.org/1999/02/22-rdf-syntax-ns#type>
22   <urn:lsid:lsid.ibm.com:2005-06-workflow:Parameter> .
23   <http://gInputA> <http://www.w3.org/1999/02/22-rdf-syntax-ns#type>
24   <urn:lsid:lsid.ibm.com:2005-06-workflow:LiteralParameter> .
25   <http://gInputA> <http://www.w3.org/1999/02/22-rdf-syntax-ns#type>
26   <urn:lsid:lsid.ibm.com:2005-06-workflow:LiteralInput> .
27
28   # same as gInputA
29   <http://gInputB> <urn:lsid:lsid.ibm.com:2005-06-workflow:correspondsTo>
30   <http://objs#adderinputb> .
31   <http://gInputB> <http://www.w3.org/1999/02/22-rdf-syntax-ns#type>
32   <urn:lsid:lsid.ibm.com:2005-06-workflow:Input> ..
33   <http://gInputB> <http://www.w3.org/1999/02/22-rdf-syntax-ns#type>
34   <urn:lsid:lsid.ibm.com:2005-06-workflow:Parameter> .
35   <http://gInputB> <http://www.w3.org/1999/02/22-rdf-syntax-ns#type>
36   <urn:lsid:lsid.ibm.com:2005-06-workflow:LiteralParameter> .
37   <http://gInputB> <http://www.w3.org/1999/02/22-rdf-syntax-ns#type>
38   <urn:lsid:lsid.ibm.com:2005-06-workflow:LiteralInput> .
39
40   # This is the grounding for the multiplication process. Analagous to the adder grounding
41   above.
42   <http://objs#bgrounding> <http://www.w3.org/1999/02/22-rdf-syntax-ns#type>
43   <urn:lsid:lsid.ibm.com:2005-06-workflow:StatusObject> .
44   <http://objs#bgrounding> <urn:lsid:lsid.ibm.com:2005-06-workflow:hasInput>
45   <http://gbInputB> .
```

*FIG. 3I*

```
1   <http://objs#bgrounding> <http://www.w3.org/1999/02/22-rdf-syntax-ns#type>
2   <http://www.daml.org/services/owl-s/1.1/Service.owl#ServiceGrounding> .
3   <http://objs#bgrounding> <urn:lsid:lsid.ibm.com:2005-06-workflow:invokableLocation>
4   "urn:lsid:slingshot:local:location"^^<http://www.w3.org/2001/XMLSchema#string> .
5   <http://objs#bgrounding> <http://www.w3.org/1999/02/22-rdf-syntax-ns#type>
6   <urn:lsid:lsid.ibm.com:2005-06-workflow:BaseGrounding> .
7   <http://objs#bgrounding> <http://www.w3.org/1999/02/22-rdf-syntax-ns#type>
8   <urn:lsid:lsid.ibm.com:2005-06-workflow:InvokableGrounding> .
9   <http://objs#bgrounding> <urn:lsid:lsid.ibm.com:2005-06-workflow:hasInput>
10  <http://gbInputA> .
11  <http://objs#bgrounding> <http://www.daml.org/services/owl-
12  s/1.1/Service.owl#supportedBy> <workflow:mathsequence> .
13  <http://objs#bgrounding> <urn:lsid:lsid.ibm.com:2005-06-workflow:invokableClass>
14  "com.ibm.slrp.slingshot.invokable.Multiplier"^^<http://www.w3.org/2001/XMLSchema
15  #string> .
16  <http://objs#bgrounding> <urn:lsid:lsid.ibm.com:2005-06-workflow:status>
17  "ready"^^<http://www.w3.org/2001/XMLSchema#string> .
18  <http://objs#bgrounding> <urn:lsid:lsid.ibm.com:2005-06-workflow:supports> <perf:b1>
19
20
21  # The first input into the multiplier grounding has no value because its value will be
22  determined by the output of the adder process
23  <http://gbInputA> <urn:lsid:lsid.ibm.com:2005-06-workflow:correspondsTo>
24  <http://objs#multiplierinputa> .
25  <http://gbInputA> <http://www.w3.org/1999/02/22-rdf-syntax-ns#type>
26  <urn:lsid:lsid.ibm.com:2005-06-workflow:Input> .
27  <http://gbInputA> <http://www.w3.org/1999/02/22-rdf-syntax-ns#type>
28  <urn:lsid:lsid.ibm.com:2005-06-workflow:LiteralParameter> .
29  <http://gbInputA> <http://www.w3.org/1999/02/22-rdf-syntax-ns#type>
30  <urn:lsid:lsid.ibm.com:2005-06-workflow:LiteralInput> .
31  <http://gbInputA> <http://www.w3.org/1999/02/22-rdf-syntax-ns#type>
32  <urn:lsid:lsid.ibm.com:2005-06-workflow:Parameter> .
33
34  # The second input of the multiplier grounding is specified as the value 7.
35  <http://gbInputB> <urn:lsid:lsid.ibm.com:2005-06-workflow:literalValue>
36  "7"^^<http://www.w3.org/2001/XMLSchema#int> .
37  <http://gbInputB> <urn:lsid:lsid.ibm.com:2005-06-workflow:correspondsTo>
38  <http://objs#multiplierinputb> .
39  <http://gbInputB> <http://www.w3.org/1999/02/22-rdf-syntax-ns#type>
40  <urn:lsid:lsid.ibm.com:2005-06-workflow:Input> .
41  <http://gbInputB> <http://www.w3.org/1999/02/22-rdf-syntax-ns#type>
42  <urn:lsid:lsid.ibm.com:2005-06-workflow:LiteralParameter> .
43  <http://gbInputB> <http://www.w3.org/1999/02/22-rdf-syntax-ns#type>
44  <urn:lsid:lsid.ibm.com:2005-06-workflow:LiteralInput> .
45  <http://gbInputB> <http://www.w3.org/1999/02/22-rdf-syntax-ns#type>
46  <urn:lsid:lsid.ibm.com:2005-06-workflow:Parameter> .
```

*FIG. 3J*

```
1
2    # The BaseGrounding of the composite process. It has two inputs and and output whose
3    value will be computed by the child
4    # processes.
5    <bg:cpg> <http://www.w3.org/1999/02/22-rdf-syntax-ns#type>
6    <urn:lsid:lsid.ibm.com:2005-06-workflow:StatusObject> .
7    <bg:cpg> <http://www.w3.org/1999/02/22-rdf-syntax-ns#type>
8    <http://www.daml.org/services/owl-s/1.1/Service.owl#ServiceGrounding> .
9    <bg:cpg> <urn:lsid:lsid.ibm.com:2005-06-workflow:hasOutput> <litoutput:cpgc> .
10   <bg:cpg> <urn:lsid:lsid.ibm.com:2005-06-workflow:hasInput> <litinput:cpga> .
11   <bg:cpg> <http://www.w3.org/1999/02/22-rdf-syntax-ns#type>
12   <urn:lsid:lsid.ibm.com:2005-06-workflow:BaseGrounding> .
13   <bg:cpg> <http://www.daml.org/services/owl-s/1.1/Service.owl#supportedBy>
14   <workflow:mathsequence> .
15   <bg:cpg> <urn:lsid:lsid.ibm.com:2005-06-workflow:hasInput> <litinput:cpgb> .
16   <bg:cpg> <urn:lsid:lsid.ibm.com:2005-06-workflow:status>
17   "ready"^^<http://www.w3.org/2001/XMLSchema#string> .
18   <bg:cpg> <urn:lsid:lsid.ibm.com:2005-06-workflow:supports> <perf:cp> .
19
20   # The first input into the composite has value 3.  Base on the wiring above, the value will
21   be channeled into the first input
22   # of the adder process
23   <litinput:cpga> <http://www.w3.org/1999/02/22-rdf-syntax-ns#type>
24   <urn:lsid:lsid.ibm.com:2005-06-workflow:Parameter> .
25   <litinput:cpga> <http://www.w3.org/1999/02/22-rdf-syntax-ns#type>
26   <urn:lsid:lsid.ibm.com:2005-06-workflow:LiteralParameter> .
27   <litinput:cpga> <http://www.w3.org/1999/02/22-rdf-syntax-ns#type>
28   <urn:lsid:lsid.ibm.com:2005-06-workflow:LiteralInput> .
29   <litinput:cpga> <urn:lsid:lsid.ibm.com:2005-06-workflow:literalValue>
30   "3"^^<http://www.w3.org/2001/XMLSchema#int> .
31   <litinput:cpga> <http://www.w3.org/1999/02/22-rdf-syntax-ns#type>
32   <urn:lsid:lsid.ibm.com:2005-06-workflow:Input> .
33   <litinput:cpga> <urn:lsid:lsid.ibm.com:2005-06-workflow:correspondsTo> <input:cpa> .
34
35   # The second input into the composite has value 8.  Base on the wiring above, the value
36   will be channeled into the second input
37   # of the adder process.
38   <litinput:cpgb> <http://www.w3.org/1999/02/22-rdf-syntax-ns#type>
39   <urn:lsid:lsid.ibm.com:2005-06-workflow:Parameter> .
40   <litinput:cpgb> <http://www.w3.org/1999/02/22-rdf-syntax-ns#type>
41   <urn:lsid:lsid.ibm.com:2005-06-workflow:LiteralParameter> .
42   <litinput:cpgb> <urn:lsid:lsid.ibm.com:2005-06-workflow:literalValue>
43   "8"^^<http://www.w3.org/2001/XMLSchema#int> .
44   <litinput:cpgb> <urn:lsid:lsid.ibm.com:2005-06-workflow:correspondsTo> <input:cpb> .
45   <litinput:cpgb> <http://www.w3.org/1999/02/22-rdf-syntax-ns#type>
46   <urn:lsid:lsid.ibm.com:2005-06-workflow:LiteralInput> .
```

*FIG. 3K*

```
1   <litinput:cpgb> <http://www.w3.org/1999/02/22-rdf-syntax-ns#type>
2   <urn:lsid:lsid.ibm.com:2005-06-workflow:Input> .
3
4   # The output does not have a value yet because it will be computed by the processes.
5   <litoutput:cpgc> <urn:lsid:lsid.ibm.com:2005-06-workflow:correspondsTo>
6   <output:cpc> .
7   <litoutput:cpgc> <http://www.w3.org/1999/02/22-rdf-syntax-ns#type>
8   <urn:lsid:lsid.ibm.com:2005-06-workflow:Parameter> .
9   <litoutput:cpgc> <http://www.w3.org/1999/02/22-rdf-syntax-ns#type>
10  <urn:lsid:lsid.ibm.com:2005-06-workflow:LiteralOutput> .
11  <litoutput:cpgc> <http://www.w3.org/1999/02/22-rdf-syntax-ns#type>
12  <urn:lsid:lsid.ibm.com:2005-06-workflow:Output> .
13  <litoutput:cpgc> <http://www.w3.org/1999/02/22-rdf-syntax-ns#type>
14  <urn:lsid:lsid.ibm.com:2005-06-workflow:LiteralParameter> .
15
16
17
18
19
20
```

*FIG. 3L*

METHOD AND APPARATUS FOR GRAPHICALLY DISPLAYING COMPATIBLE WORKFLOW STEPS

CROSS REFERENCE TO RELATED APPLICATION

This application is related to the inventors' application "SYSTEM AND METHOD FOR MANAGING WORKFLOW EXECUTION IN A DISTRIBUTED SYSTEM," Ser. No. 11/324,972, now 2007/0156878, which was filed on the same day as the present application and commonly assigned herewith to International Business Machines Corporation. This related application is incorporated herein by reference in its entirety.

FIELD OF THE INVENTION

The present invention generally relates to the field of workflows, and more particularly relates to managing workflow steps through a user interface.

BACKGROUND OF THE INVENTION

Workflow is among the most highly investigated problems in distributed computing and many complete workflow systems exist. However, these workflow systems execute jobs in a homogeneous way. For example, BPEL4WS is a workflow specification for orchestrating Web Service invocations in order to realize a workflow. IBM's LoadLeveler is a high performance computing job scheduler that can orchestrate workflows running on clusters of machines connected by a network. Lotus Workflow is a system for orchestrating workflow where the jobs are performed by user applications on personal workstations and orchestrated via a document management system.

Although useful, these workflow systems are not without their deficiencies, drawbacks, and problems. For example, these workflow systems cannot orchestrate workflow where the job steps involved are high performance computing applications, web services, and user applications. In addition, advanced fields such as Cancer research require workflows involving the participation of laboratory equipment.

Workflow systems sometimes provide user interfaces for user interaction with the workflow. However, these user interfaces are often difficult to use when trying to find compatible input and output parameters for workflow steps. For example, in a semantic data application, where a data object in the system might represent any number of different semantic data types, it is not always possible for a user to easily determine which parts of an application can provide and or accept the data objects when they are involved in a drag and drop operation. Current user interfaces utilizing drag and drop features, show a user which parts of the application can accept or provide a data object by changing the mouse icon when the a data object is dragged over different parts of the application. The drawback of this type of system, is that the user must first drag the data object to all possible parts of an application to determine which parts of the application are valid receptors of the drag and drop operation.

Therefore a need exists to overcome the problems with the prior art as discussed above.

SUMMARY OF THE INVENTION

Briefly, in accordance with the present invention, disclosed are a method, apparatus, and computer program product for graphically presenting compatible workflow steps to a user through a graphical user interface are disclosed. The method includes graphically displaying a plurality of steps in a workflow. A user's selection for at least one step in plurality of steps to denote at least one selected step and at least one non-selected step is received. The method further includes determining if at least one of a set of one or more output parameters of the selected step is acceptable as an input of the non-selected step of the workflow. In response to the set of one or more output parameters of the selected step being acceptable, an appearance of the non-selected step is graphically changed. The method also includes determining if a set of one or more output parameters of the non-selected step is acceptable as an input of the selected step. In response to the set of one or more output parameters of the non-selected step being acceptable, an appearance of the non-selected step is graphically changed.

In another embodiment of the present invention, a user interface for graphically presenting compatible workflow steps to a user is disclosed. The user interface comprises at least one window for graphically displaying a plurality of steps in a workflow. At least a first visual indicator for denoting a user's selection of at least one step in the plurality of steps and non-selection of at least one remaining step in the plurality of steps is also included. At least a second visual indicator is also included. The second visual indicator is for indicating that a set of one or more output parameters of the selected step is acceptable as an input of the non-selected step of the workflow. The appearance of the non-selected step is graphically changed in response to the set of one ore more output parameters of the selected step being acceptable.

The second visual indicator is also for indicating that a set of one or more output parameters of the non-selected step is acceptable as an input of the selected step. The appearance of the non-selected step is graphically changed in response to the set of one or more output parameters of the non-selected step being acceptable.

In yet another embodiment of the present invention, a computer program product for graphically compatible workflow steps to a user through a graphical user interface is disclosed. The computer program product includes graphically displaying a plurality of steps in a workflow. A user's selection for at least one step in plurality of steps to denote at least one selected step and at least one non-selected step is received. Further instructions are included for determining if at least one of a set of one or more output parameters of the selected step is acceptable as an input of the non-selected step of the workflow. In response to the set of one or more output parameters of the selected step being acceptable, an appearance of the non-selected step is graphically changed. The method also includes determining if a set of one or more output parameters of the non-selected step is acceptable as an input of the selected step. In response to the set of one or more output parameters of the non-selected step being acceptable, an appearance of the non-selected step is graphically changed.

An advantage of the foregoing embodiment is that a user is able to use a workflow user interface to manage a workflow. When a workflow step is selected all of the compatible steps that can accept its output or provide an input are automatically displayed. A user does not have to drag a particular workflow step over the other steps to find out which steps can accept the output of the particular workflow step. The user interface provides a user with visual feedback or cures that help identify compatible inputs and outputs.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 3 is an exemplary annotated listing of Resource Description Framework triples that correspond to a workflow;

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to an embodiment, overcomes problems with the prior art by orchestrating a workflow in a non-centralized fashion. In other words, a single program is not continually orchestrating the workflow. Another advantage of the present invention is that a system can orchestrate workflows involving diverse types of processes in a highly distributed environment. For example, job steps involving high processing computer applications, web services, user applications, and laboratory equipment are able to be integrated and execute a workflow.

Another advantage of the present invention is that a user is able to use a workflow user interface to manage a workflow. When a workflow step is selected all of the compatible steps that can accept its output or provide an input are automatically displayed. A user does not have to drag an input connector or an output connector over each step to find out which steps can accept the output. The user interface provides a user with visual feedback or cures that help identify compatible inputs and outputs.

Exemplary Workflow Management System

Figure 1:
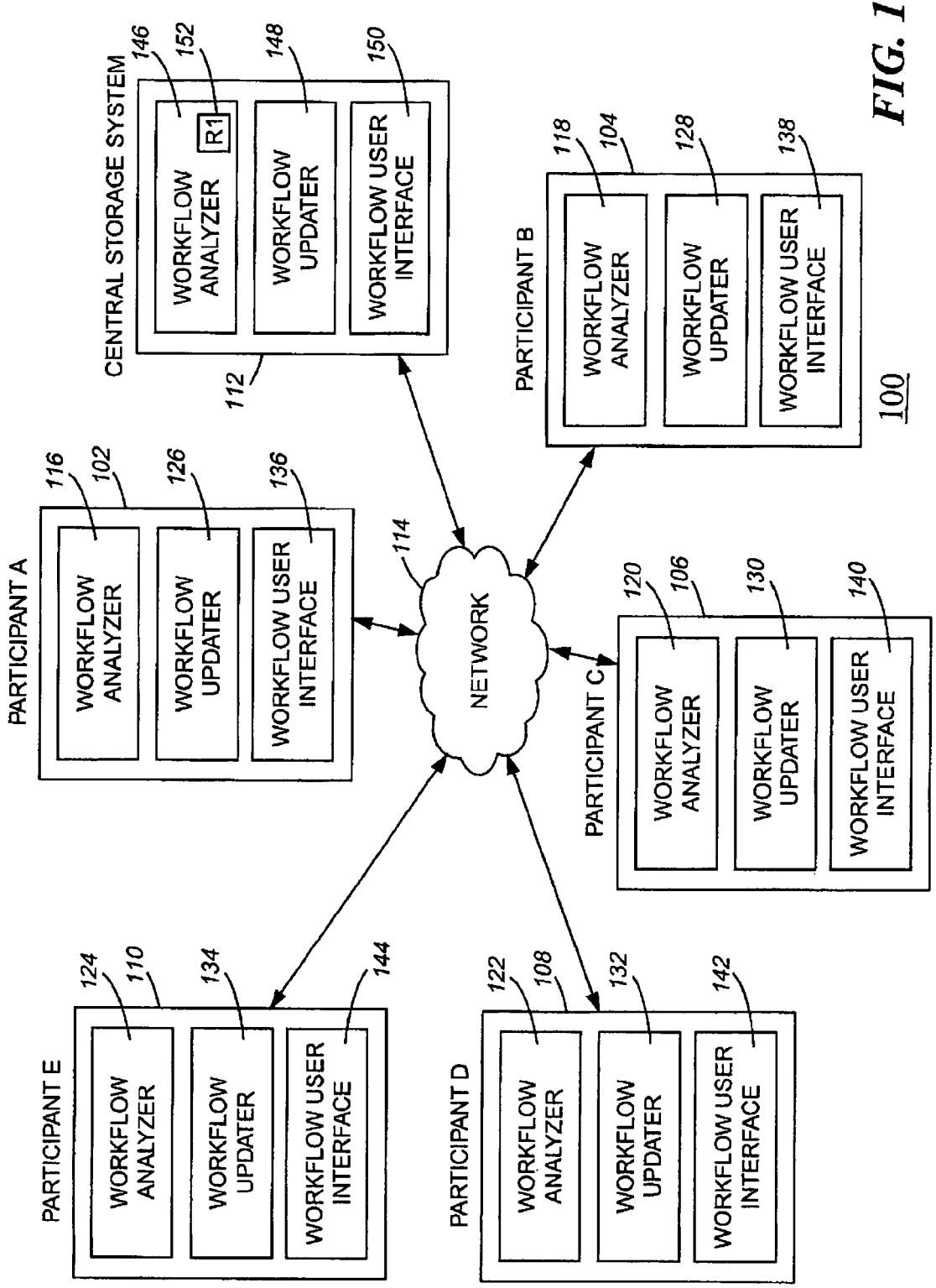
FIG. 1 is block diagram illustrating an exemplary workflow management system according to an embodiment of the present invention.

According to an embodiment of the present invention, as shown in FIG. 1, an exemplary workflow management system 100 is illustrated. FIG. 1 shows a system 100 comprising Participant A 102, Participant B 104, Participant C 106, Participant D 108, Participant E 110, a central storage system 112, and a network 114. A participant, in one embodiment, is an information processing system or a plurality of information processing system communicatively coupled together to perform one or more steps of a workflow. A workflow, for example, is one or more interrelated steps that are distinct and where the output of one step can be the input of another step. In another embodiment, a participant is laboratory equipment communicatively coupled to an information processing system. Each participant includes at least one resource such as processing capabilities, algorithms, or the like that are needed to perform the one or more steps of the workflow. For example, in one embodiment, Participant A 102 provides a high performance computing/grid environment comprising a plurality of information processing systems. The plurality of information processing systems, for example, concurrently executes one or more workflow steps that require significant computation. Participant B 104, in one embodiment, is a notebook computer allowing human interaction such as output verification in real time.

Participant C 106, in one embodiment, is a workstation comprising programs made available by the user of the workstation to be used as workflow steps. Participant D 108, for example, is laboratory equipment used for scientific workflows and interacts with the system 100 through an information processing system. Participant E 110, in one embodiment, is a web services invoker that is used to invoke web services on behalf of the users of the Participant E 110 information processing system. Each participant 102, 104, 106, 108, 110 communicates with the central storage system 112 through the network 114. The network 114, according to one embodiment, is a LAN, WAN, World Wide Web, wired, wireless network, or the like.

Each participant 102, 104, 106, 108, 110 includes a workflow analyzer 116, 118, 120, 122, 124, a workflow updater 126, 128, 130, 132, 134, and a workflow user interface 136, 138, 140, 142, 144, which will be discussed in greater detail below. The central storage system 112 includes a workflow database 146, a workflow information transceiver 148, and a workflow updater 150. In one embodiment, the central storage system 112 is a resource description framework ("RDF") storage system. In another embodiment, the central storage system 112 is an extensible markup language ("XML") storage system. The workflow database 146, for example, is a file such as a relational database or an object oriented database that backs the central storage system 112. The workflow database 146, in one embodiment, publishes updates associated with workflows in the database 146 using a high performance publish/subscribe system such as a Collections, ACLS, Replication, and Transaction system ("CART"). CART is an implementation of an RDF-based central storage system such as the central storage system 112. In a CART system each triple <subject><predicate><object> may be placed in zero or more collections for the purpose of identification and subscription in publication-subscription services.

An ACL is an access control list. Each triple or collection has an access control list that determines who can read/modify the triple. Client's of CART write their data first to a local memory or file store. The data may then be replicated to the central storage system 112, and new data is pulled down based on subscription. In one embodiment of the present invention, a client-pull rather than a server push is used to retrieve the data. In another embodiment of the present invention, both a client-pull and a server push are used to retrieve the data. Each time a client of CART submits data to the central storage system 112, the updates are processed as a transaction so that any conflicts with other users are resolved or errors are raised.

In one embodiment, the central storage system stores RDF. For example, the central storage system 112 stores OWL-S, which is a set of RDF ontologies created using the Ontology Web Language ("OWL") that defines how workflows are embodied in RDF. For example, if a particular step of a workflow outputs an image, that step commits the image itself to a data storage system (not shown), and provides the RDF central storage system with a link or pointer to the actual data to be stored with the workflow image. These links or pointers, in one embodiment, are file paths in the case of a distributed file system or HTTP/FTP URL's when the data storage system (not shown) is a Web Server. In another embodiment, a life science identifier ("LSID") is used. A LSID uniquely identifies and resolves pieces of data that are used or created in a workflow. LSIDs were initially developed for the Life Sciences community but can be easily applied in any data-needy domain. The data storage system (not shown) that assigns LSIDs to data (and in tern provides their resolution) is called a dynamic data repository ("DDR").

The workflow transceiver 148 transmits and receives workflow information. For example, workflows and workflow updates that are transmitted by the participants 102, 104, 106, 108, 110 are received at the central storage system 112 by the workflow information transceiver 148. In one embodiment, the workflow information transceiver is a general purpose RDF storage service. The workflow information transceiver 148 also transmits notifications to the participants 102, 104, 106, 108, 110 when a workflow is updated. A workflow is updated, for example, when a step of the workflow is completed. The workflow updater 150 updates a workflow in the workflow database 146 based on information received by the workflow information transceiver 148. The workflow database 146 also includes at least one record 152 for each workflow managed by the workflow database 146. The workflow database record 152 will be discussed in greater detail below.

Exemplary Information Processing System

Figure 2:
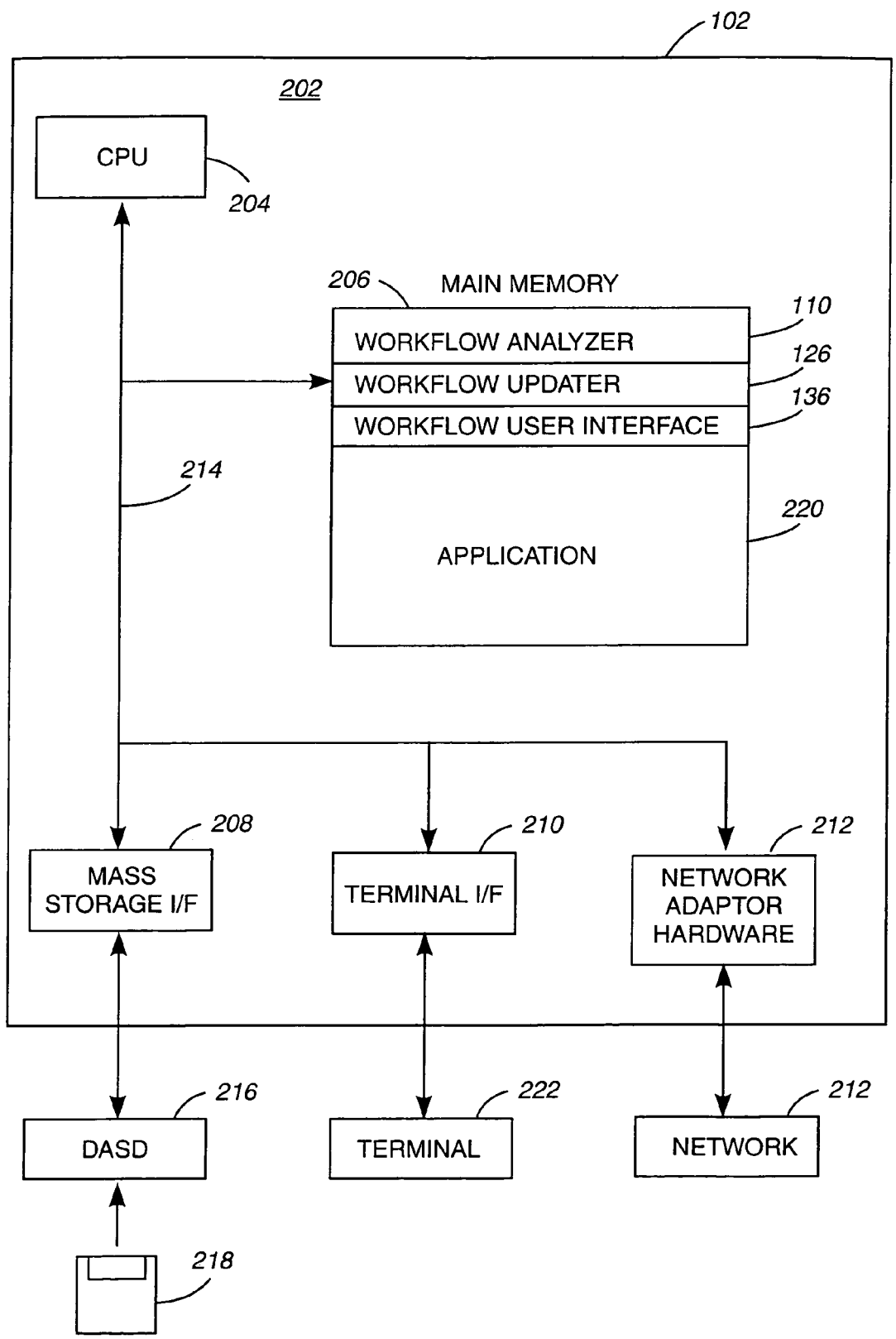
FIG. 2 is a block diagram illustrating an exemplary information processing according to an embodiment of the present invention

FIG. 2 is a block diagram illustrating a more detailed view of the Participant A 102 information processing system according to an embodiment of the present invention. Although the following discussion is with respect to the Participant A 102 information processing system, the following discussion is also applicable to each of the information processing systems used as a participant or communicatively coupled to a participant of a workflow as shown in FIG. 1. The Participant A 102 information processing system is based upon a suitably configured processing system adapted to implement the exemplary embodiment of the present invention. Any suitably configured processing system is similarly able to be used as the Participant A 102 information processing system by embodiments of the present invention, for example, a personal computer, workstation, or the like. The Participant A 102 information processing system includes a computer 202. The computer 202 has a processor 204 that is connected to a main memory 206, mass storage interface 208, terminal interface 210, and network adapter hardware 212. A system bus 214 interconnects these system components. The mass storage interface 208 is used to connect mass storage devices, such as data storage device 216, to the Participant A 102 information processing system. One specific type of data storage device is a computer readable medium such as a floppy disk drive, which may be used to store data to and read data from a floppy diskette 218 or CD (not shown). Another type of data storage device is a data storage device configured to support NTFS type file system operations.

The main memory 206 comprises the workflow analyzer 116. The workflow analyzer 116 analyzes the workflow in the central storage system 112. For example, a participant subscribes to the central storage system 112. Each step in a workflow that is stored in the central storage system 112 identifies a particular location/participant where the step is to be executed. As a subscriber, the participant recognizes that it is a participant of a workflow and the workflow analyzer 116 analyzes the workflow to determine which steps of the workflow are currently executable at its location. The workflow analyzer 116 also analyzes a workflow after the Participant A 102 information processing system receives a notification from the central storage system 112 that the workflow has been updated.

The main memory 206 also includes the workflow updater 126. The workflow updater 126 transmits workflow update information to the central storage system 112. Workflow update information, in one embodiment, includes output data from a completed step; a notification that a particular step has been completed; and the like. The main memory also comprises a workflow user interface 136. The workflow user interface 136 allows a user at the Participant A 102 information processing system to interact with one or more subscribed to workflows. For example, the workflow user interface 136, in one embodiment, indicates visually, the inputs and outputs of the steps that may be wired together.

The Participant A 102 information processing system also includes a job scheduler (not shown) such as IBM's Load Leveler in the main memory 206. The job scheduler (not shown), among other things, allows multiple workflow steps to be performed on the Participant A 102 information processing system. In one embodiment, the main memory 206 also includes a workflow language interpreter (not shown) such as an OWL-S interpreter, a BPEL4WS interpreter, or the like. The workflow language interpreter (not shown) allows the workflow analyzer 136 to determine what workflow steps are next in the workflow. The workflow language interpreter (not shown) also allows the workflow analyzer 136 to determine if the steps of the workflow are bound to the current location and if they can be executed under one or more identities of the Participant A 102.

The identity of a participant, in one embodiment, is the username under which a particular participant interacts with the central storage system 112, for example, CART. The identity of a participant is also used as the login in the embodiment where a DDR data store is performed. A workflow, in one embodiment, identifies the identity under which a step is executable. For example, a first user of the information processing system may make certain resources available for the workflow while a second user may not.

An application 220 such as an application needed for executing a workflow step is also included in the main memory 206. The application 220, for example, is running or waiting to be executed. Although illustrated as concurrently resident in the main memory 206, it is clear that respective components of the main memory 206 are not required to be completely resident in the main memory 206 at all times or even at the same time. In one embodiment, the server1 106 utilizes conventional virtual addressing mechanisms to allow programs to behave as if they have access to a large, single storage entity, referred to herein as a computer system memory, instead of access to multiple, smaller storage entities such as the main memory 206 and data storage device 216. Note that the term "computer system memory" is used herein to generically refer to the entire virtual memory of the Participant A 102 information processing system.

Although only one CPU 204 is illustrated for computer 202, computer systems with multiple CPUs can be used equally effectively. Embodiments of the present invention further incorporate interfaces that each includes separate, fully programmed microprocessors that are used to off-load processing from the CPU 204. Terminal interface 210 is used to directly connect one or more terminals 222 to computer 202 to provide a user interface to the server1 106. These terminals 222, which are able to be non-intelligent or fully programmable workstations, are used to allow system administrators and users to communicate with the Participant A 102 information processing system. The terminal 222 is also able to consist of user interface and peripheral devices that are connected to computer 202 and controlled by terminal interface hardware included in the terminal I/F 210 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the server1 106.

The network adapter hardware 212 is used to provide an interface to the network 114. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 218, CD ROM, or other form of recordable media, or via any type of electronic transmission mechanism.

Exemplary Annotated Listing of Resource Description Framework Triples

FIG. 13 illustrates an exemplary annotated listing of Resource Description Framework triples that correspond to a workflow. For example, FIG. 3 shows the RDF triples for a workflow that is about to be executed. As each step is executed, as described will be described below, each participant 102, 104, 108, 108, 110 submits updates. The workflow updater 126 updates the RDF triples accordingly.

Exemplary Workflow User Interface

Figure 4:
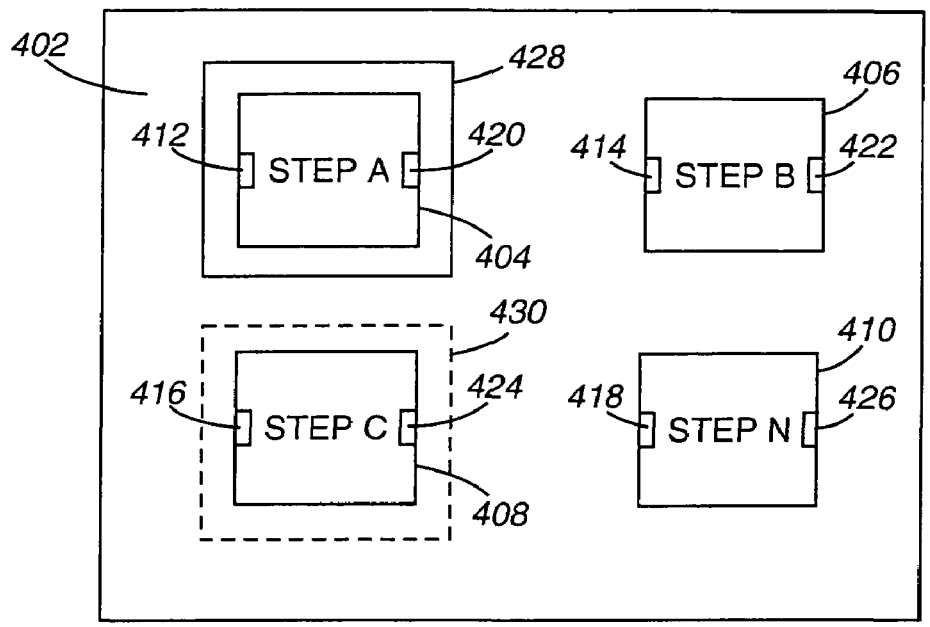
FIG. 4 is a block diagram illustrating an exemplary workflow user interface according to an embodiment of the present invention.
Figure 5:
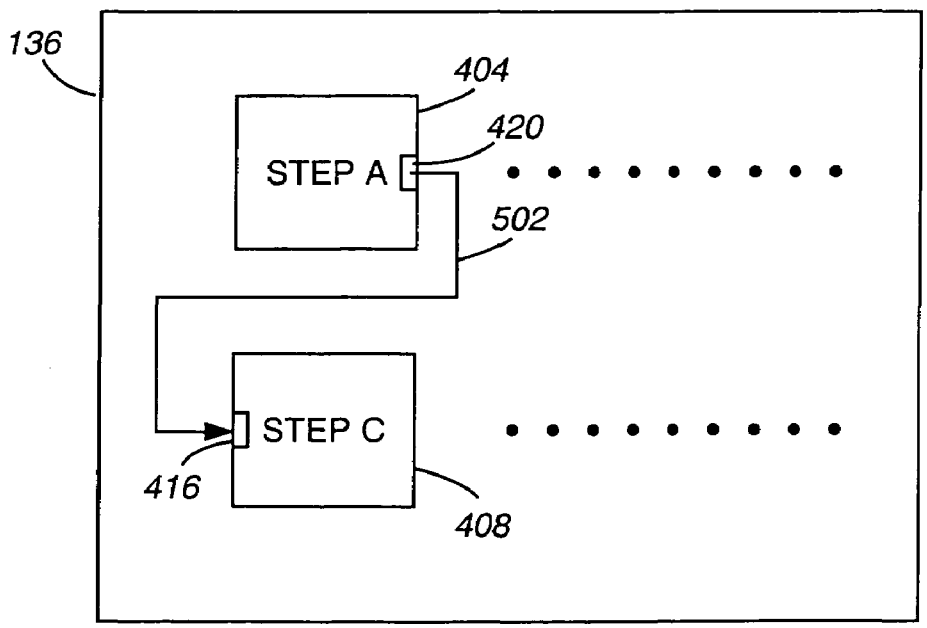
FIG. 5 is a block diagram illustrating the exemplary workflow user interface according to another embodiment of the present invention.
Figure 6:
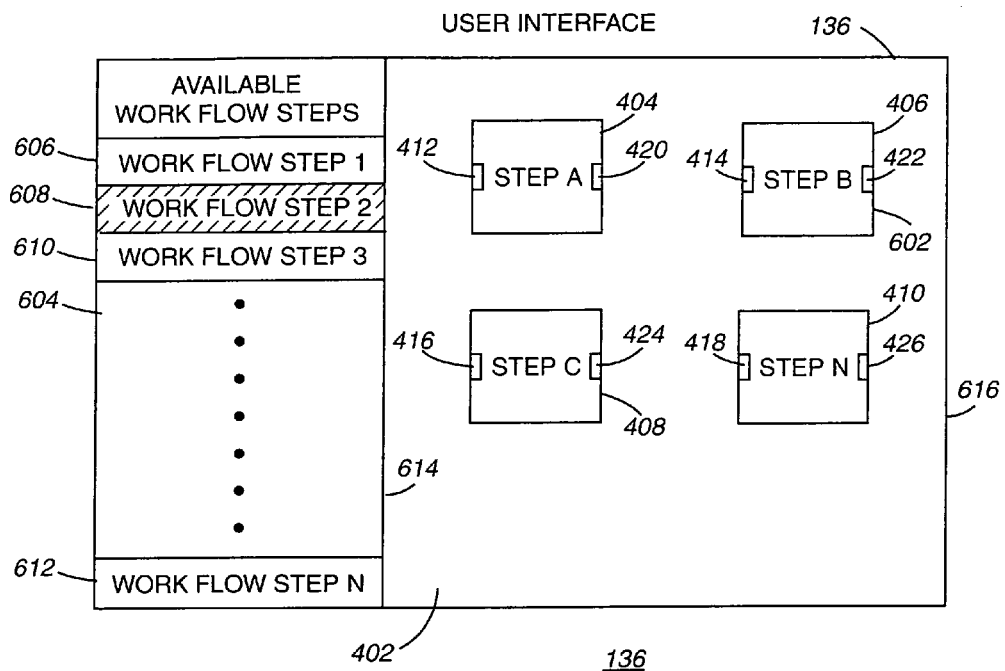
FIG. 6 is a block diagram illustrating the exemplary workflow user interface according to another embodiment of the present invention.

FIG. 4, FIG. 5, and FIG. 6 illustrate an exemplary workflow user interface 136 according to an embodiment of the present invention. FIG. 4 illustrates a workflow user interface 136 for graphically displaying compatible inputs and outputs of steps can be wired together. The workflow user interface 136, among other things, visually represents a workflow. A user can create/delete workflow steps, track the progress of the workflow, manipulate workflow steps, add/change input, and output parameters of a workflow step, and the like through the workflow user interface 136.

The workflow user interface 136 includes a window 402 for displaying various components of the interface 136. For example, the steps 404, 406, 408, 410 of a selected workflow are graphically displayed in the window 402. FIG. 4 shows a workflow comprising Step A 404, Step B 406, Step C 408, and Step N 410. The steps 404, 406, 408, 410 are represented graphically by a box. In another embodiment, the steps 404, 406, 408, 410 are represented graphically by an icon, picture, or the like. In one embodiment, inputs and outputs of a step are also graphically represented in the interface 136. For example, input boxes 412, 414, 416, 418 and output boxes 420, 422, 424, 426 are included in each step 404, 406, 408, 410. Although only one input/output box is shown in FIG. 4, each input/output connector can represent zero or more inputs or outputs, respectively.

The workflow user interface 136 allows a user to select one or more of the graphically represented steps 404, 406, 408, 410. When a user selects a step 404, 406, 408, 410, the appearance of the selected step is visually altered. For example, Step A 404 is selected in FIG. 4 and has a solid outlined box 428 surrounding the box representing Step A 404. In another embodiment, one or more colors are used to represent selected and non-selected steps. In an alternative embodiment, the box representing Step A 404 is resized, shaded, changed to a new graphic, or the like to visually indicate to a user that the step has been selected.

After a user has selected a step, each step in the workflow that can accept the output of the selected step is also visually identified to the user. For example, in FIG. 4, Step C 408 is the only step that can accept the output of Step A 404. Therefore, the box representing Step C 406 has a dashed box 430 surrounding it to visually indicate to the user that Step C 408 can accept the output of Step A 408. In another embodiment, one or more colors are used to represent that a step can accept an output of another step. Different colors represent the type and strength of compatibility between the output of a step and what input can be accepted at another step. For example, a first color can represent a strong compatibility and a second color can represent a weaker compatibility.

The strength of the compatibility, in one embodiment, is a function of analyzing the outputs and inputs of the steps as well as other metadata in the workflow system. For example, connection precedence, metadata between workflow steps such as organization, author, licenses, and the like are analyzed to determine the strength of compatibility. In an alternative embodiment, the box representing Step C 408 is resized, shaded, changed to a new graphic, or the like to visually indicate to a user that the step can accept the output of Step A 408. In another embodiment, the strength of the compatibility is based on a number of connection matches. For example, the percentage of inputs/outputs that are themselves compatible. In another embodiment, the strength of the compatibility is also based on the number of previous times these workflow steps have been wired together. This data, for example, can be queried in the central storage system 112.

In an alternative embodiment, a user drags a pointer (not shown) over the graphic representing a step or an output box 420, 422, 424, 426 of a step 404, 406, 408, 410. The steps that can accept the output of the currently pointed to step are visually altered. For example, the graphic representing a step that can accept the output is resized, shaded, changed to a new graphic, or the like to visually indicate the ability to accept the output. In another embodiment, as the user drags the pointer (not shown) over an output box of a step, the type output generated by the step and/or a description of the output is displayed to the user.

FIG. 5 shows one embodiment of the user interface after the output of Step A 404 has been selected to be the input of Step C 408. The workflow user interface 136 allows a user to select an output of a step and drag a connector over to an input of a step that can accept the output. For example, FIG. 5 shows a connector 502 connecting the output box 420 of Step A 404 to the input box 416 of Step C 408. The connector 502, in one embodiment, includes a color representing the type and strength of compatibility between the output of Step A 402 the acceptable input of Step C 408 as described above with reference to FIG. 4.

FIG. 6 illustrates the workflow user interface 136 according to another embodiment of the present invention. FIG. 6 illustrates the workflow user interface 136 for showing a user available workflow steps within the application and outside the application. FIG. 6 shows the window 402 for displaying various components of the interface 136. For example, the steps 404, 406, 408, 410 of a selected workflow are graphically displayed in the window 402. FIG. 6 shows a workflow comprising a Step A 404, a Step B 406, a Step C 408, and a Step N 410 each step including an input 412, 414, 416, 418 and an output 420, 422, 424, 426.

A user can select any of the available workflow steps in the window 614 and add the steps to the workflow workspace 616. The same workflow steps can be added to the workflow workspace 616 more than once. In one embodiment a user selects a workflow step for identifying which of the non-selected workflow steps can provide an input to the selected step. For example, the user selects the graphic representing Step B 406, which is then highlighted by a box 602 as described above with reference to FIG. 4. If any of the remaining steps can provide an input to Step B 406, the graphic representing those steps is visually altered (as described above with reference to FIG. 4) to indicate this.

The workflow steps in one embodiment, are part of another application residing on the information processing system being used by the user or communicatively coupled to the user information processing system through a network. For example, the user interface 136 can show the workflow steps from a life sciences application for accepting images from a microscope residing on the user information processing system. In one embodiment, all currently opened workflow steps in an application are searched for and displayed to the user through the user interface 136.

Exemplary Workflow Input/Output Flow Diagram

Figure 7:
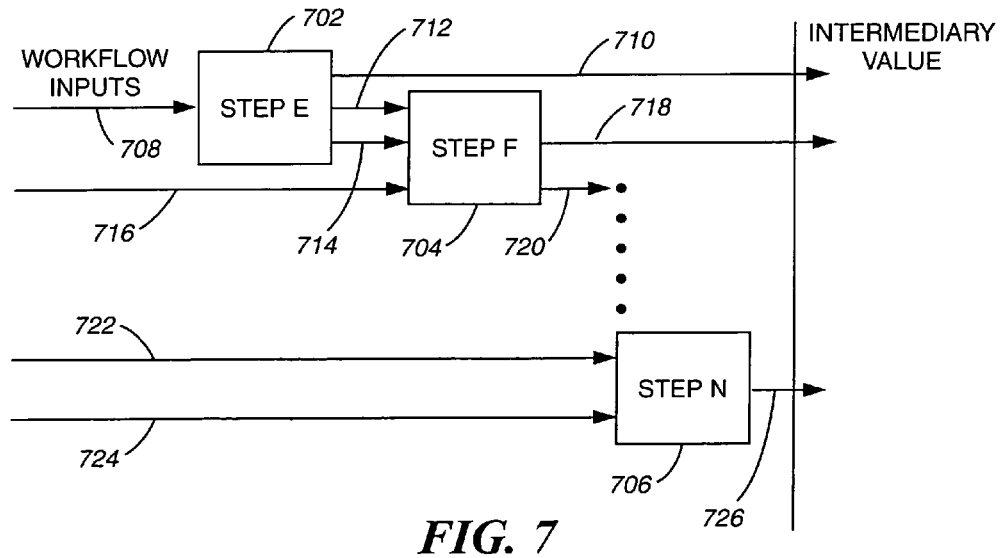
FIG. 7 is an input/output flow diagram illustrating the input/output relationship between steps of a workflow according to an embodiment of the present invention.

FIG. 7 illustrates an exemplary input/output flow diagram according to an embodiment of the present invention. FIG. 7 shows a Step E 702, a Step F 704, and a Step N 706. In this embodiment, Step E 702 has a single input 708 and generates a plurality of outputs 710, 712, 714. For example, Step E 702 can perform multiple actions upon a single input to generate one or more outputs. The input 708, in this embodiment is a predefined input. For example, the author of workflow Step E 702 submitted a predefined value for the input 708 of Step E 702 when the workflow was submitted to the central storage system 112. In another embodiment, after the workflow is submitted, but before its execution, an input value can be entered for a step. In an alternative embodiment, the input 708 is an output of another step.

Output 710, for example, is an intermediary value that is stored for verification or later use. For example, a user may retrieve the output 710 and verify its value to ensure the workflow is executing properly. The second and third outputs 712, 714 of Step E 702 are used as inputs for Step F 704. Step F also has a predefined input 716. Step F 704 produces two outputs 718, 720. One output 718 is used as an intermediary value and the other output is used as an input for another step. Step N 706 includes two predefined inputs 722, 724 which result in one output 726. The output 726 of Step N 706 in one embodiment is an intermediary value in this embodiment. If Step N 706 is the final step in the workflow, the output 726 is the final result of the workflow.

Figure 8:
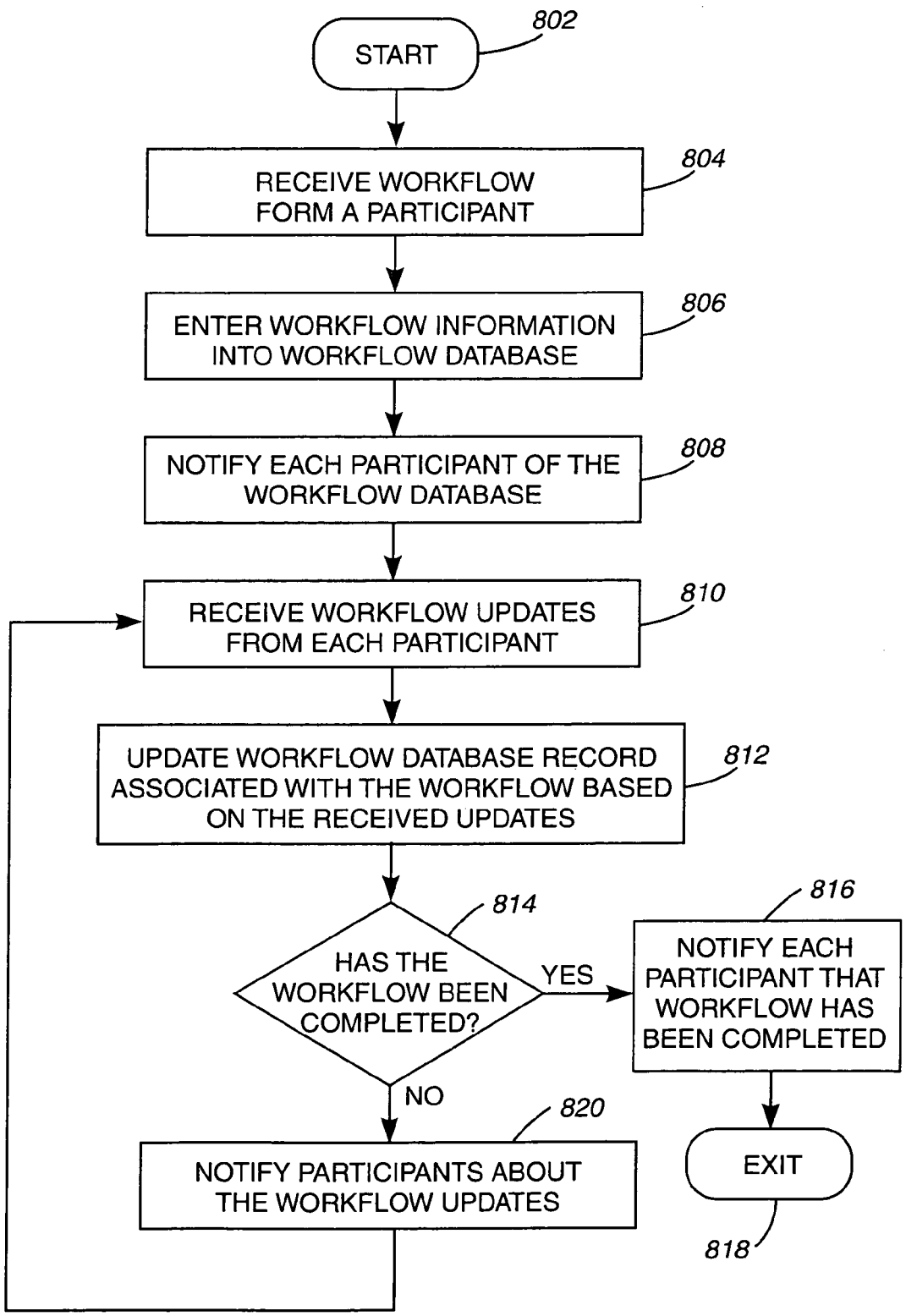
FIG. 8 is an operational flow diagram illustrating an exemplary process of a central storage system maintaining a workflow according to an embodiment of the present invention.

Exemplary Process of Sending Participants of a Workflow Information Regarding the Workflow FIG. 8 is an operational flow diagram illustrating an exemplary process of communicating workflow information to participants of the workflow by the central storage system 112. The operational flow diagram of FIG. 8 begins at step 802 and flows directly to step 804. The central storage system 112, at step 804, receives a workflow from a workflow participant. In another embodiment, the workflow is submitted by a user on an information processing machine which is not a participant of the workflow. The central storage system 112, at step 806, enters the workflow into the workflow database 146 where a record 152 is created for the entered workflow. The received workflow, for example, includes a list of participants for the workflow and any predefined values for the steps of the workflow.

A subscriber to the central storage system 112, at step 808, is identified as a participant of a workflow and receives information about the workflow. For example, a participant subscribes to the central storage system 112. Each step in a workflow that is stored in the central storage system 112 identifies a particular location/participant where the step is to be executed. A participant is selected by a creator of a workflow step, in one embodiment, based on the ability to perform a step, location, and identity of the participant. After each participant executes a step of the workflow, the workflow information transceiver 148, at step 810, receives workflow updates from each participant. For example, the update information, in one embodiment, includes completed status identifier, output values generated by completing the step, and the like. In another embodiment, workflow update information is received when a participant manipulates a workflow step. A participant, for example, can change the input parameters for the step.

The workflow updater 150, at step 812, updates the workflow database 146 based on the received updates from the participants. The central storage system 112, at step 814, determines if the workflow is completed. For example, when a participant completes a workflow step it queries the central storage system 112 to determine if the completed step was the last step of the workflow. If the participant determines that the workflow is completed, it transmits information to the central storage system 112 identifying the workflow as being completed. In other words, the participant flags the workflow as being completed. The central storage system receives this information from the participant and determines that the workflow is complete.

If the result of this determination is positive, the central storage system 112, at step 816, notifies each participant that the workflow has been completed. The control then exits at step 818. If the result of this determination is negative, the central storage system 112, at step 820, notifies the participants that the workflow has been updated. The central storage system 112 continues to receive workflow updates from the participants until the workflow has been completed. In an embodiment where the central storage system 112 is an RDF central storage system, the workflow retained in the central storage system 112 can be modified after it has been completed. For example, a human user can add additional RDF statements commenting on the success of the workflow. The participants of the work flow are then be notified of these changes.

Exemplary Process of Managing a Workflow

Figure 9:
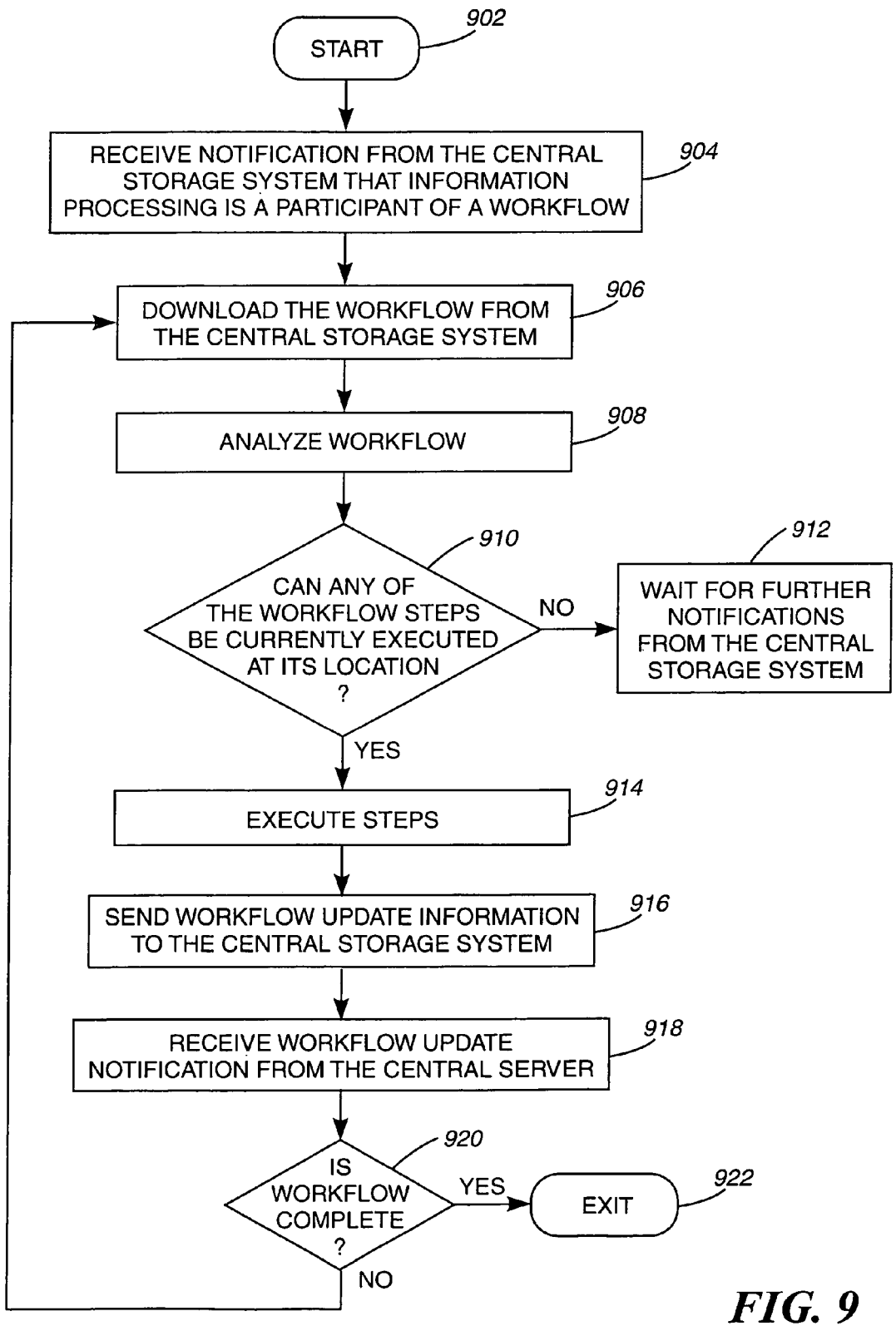
FIG. 9 is an operational flow diagram illustrating an exemplary process of a participant of a workflow interacting with the workflow according to an embodiment of the present invention.

FIG. 9 is an operational flow diagram illustrating an exemplary process of at least one workflow step by a participant of the workflow. The operational flow diagram of FIG. 9 begins at step 902 and flows directly to step 904. A workflow participant such as Participant A 102, at step 904, is identified as a participant of a workflow. Each participant 102, 104, 106, 108, 110, at step 906, performs a pull operation to obtain the workflow from the central storage system 112. The workflow, at step 908, is then analyzed by each participant 102, 104, 106, 108, 110. Each participant 102, 104, 106, 108, 110, at step 910, then determines if any of the steps associated with the respective participant can be currently performed.

If the result of this determination is negative, the participant, at step 912, waits for another notification from the central storage system 112. If the result of this determination is positive the participant, at step 914, executes the workflow step. For example, in an exemplary life sciences workflow, Participant D 108 is laboratory equipment such as a microscope that is coupled to an information processing system. The workflow step to be performed by Participant D 108 is to submit an image for processing. After a participant 102, 104, 106, 108, 110 executes one or more steps, the participant, at step 916, transmits workflow update information to the central storage system 112. For example, Participant D transmits update information in using RDF language including a pointer to the image that is to be processed.

The participants 102, 104, 106, 108, 110, at step 918, receive a notification from the central server 112 informing the participants 102, 104, 106, 108, 110 that the workflow has been updated. The participants 102, 104, 106, 108, 110, at step 920 determine if the workflow has been completed based on the update information sent by the central storage system 112. If the result of this determination is positive, the control flow exits at step 922. If the result of this determination is negative the control flows to step 906 where the participants 102, 104, 106, 108, 110 download the workflow. For example, after the workflow is updated by the central server 112 to reflect the execution of a step by Participant D, the participants are notified and determine if any of the remaining steps of the workflow can be currently executed.

Participant A 102, in one embodiment, is a high performance computing environment and uses an algorithm submitted by, for example, Participant C 106 for processing the image submitted by Participant D 108. The processing of the image by Participant A 102 and the submission of an algorithm by Participant C 106, in one embodiment, are separate steps of the workflow. For example, Participant A 102 determines that it can process the image only if the algorithm has been submitted by Participant C 106. Participant A uses both the image and algorithm as its inputs. Participant E 110, in one embodiment, are web services such as services for life sciences data that can also be used by Participant A 102 for processing the image submitted by Participant D 108. After Participant A 102 processes the image and submits its update information to the central storage system 112, Participant B 104, for example, determines that it can perform the workflow step associated with it. For example, Participant B 104 is a personal computer that allows a human to verify the results of Participant A 102. Once the verification process is completed by Participant B 104, Participant B 104 submits its update information to the central storage system 112, which determines that the workflow is completed.

One advantage of the present invention is that a workflow can be orchestrated in a non-centralized fashion. In other words, a single program is not continually orchestrating the workflow. Another advantage of the present invention is that a system can orchestrate workflows involving diverse types of processes in a highly distributed environment. For example, job steps involving high processing computer applications, web services, user applications, and laboratory equipment are able to be integrated and execute a workflow.

Figure 10:
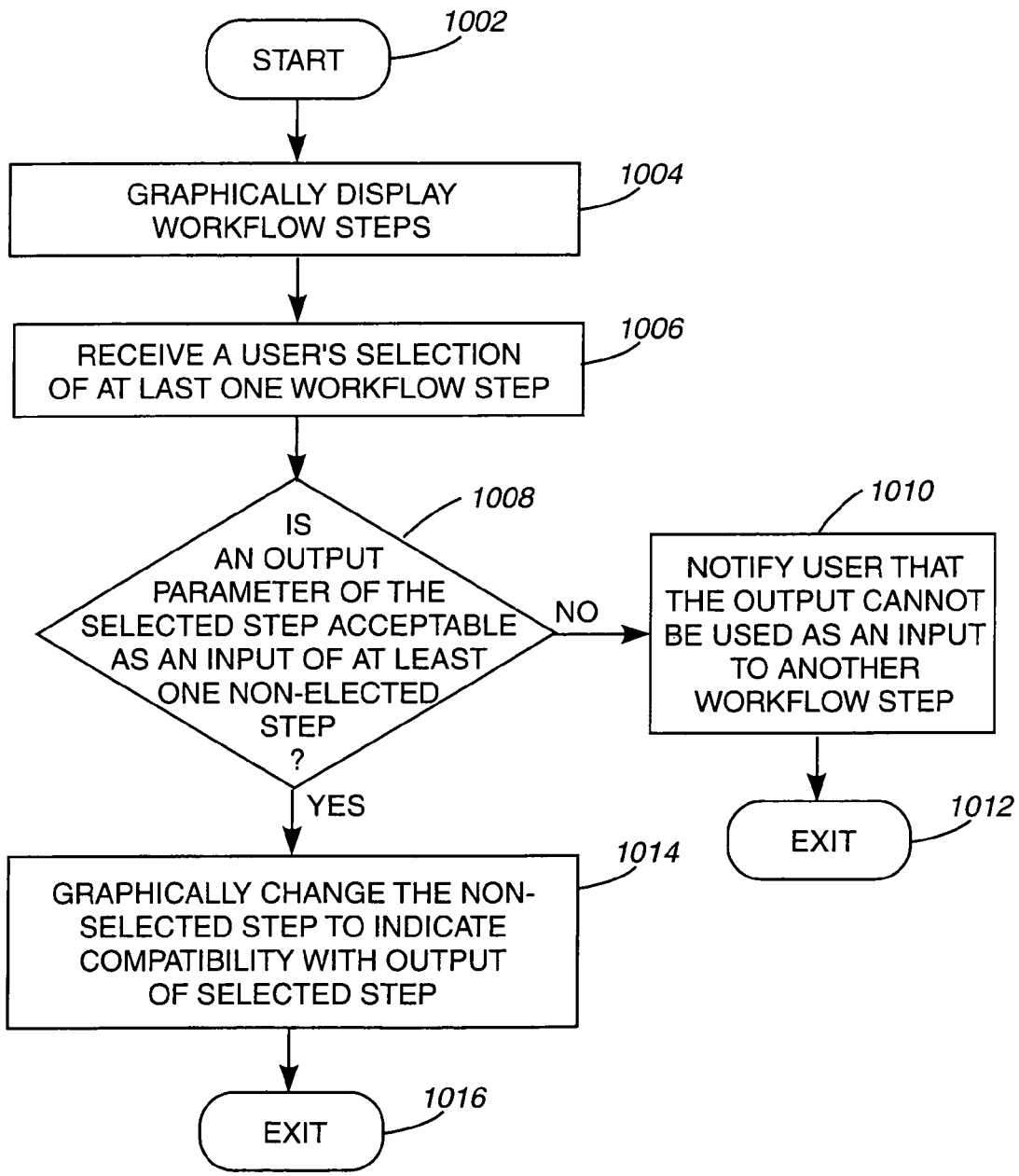
FIG. 10 is an operational flow diagram illustrating an exemplary process of a graphically displaying workflow steps and their compatibility for accepting each others output through a user interface according to an embodiment of the present invention.
Figure 11:
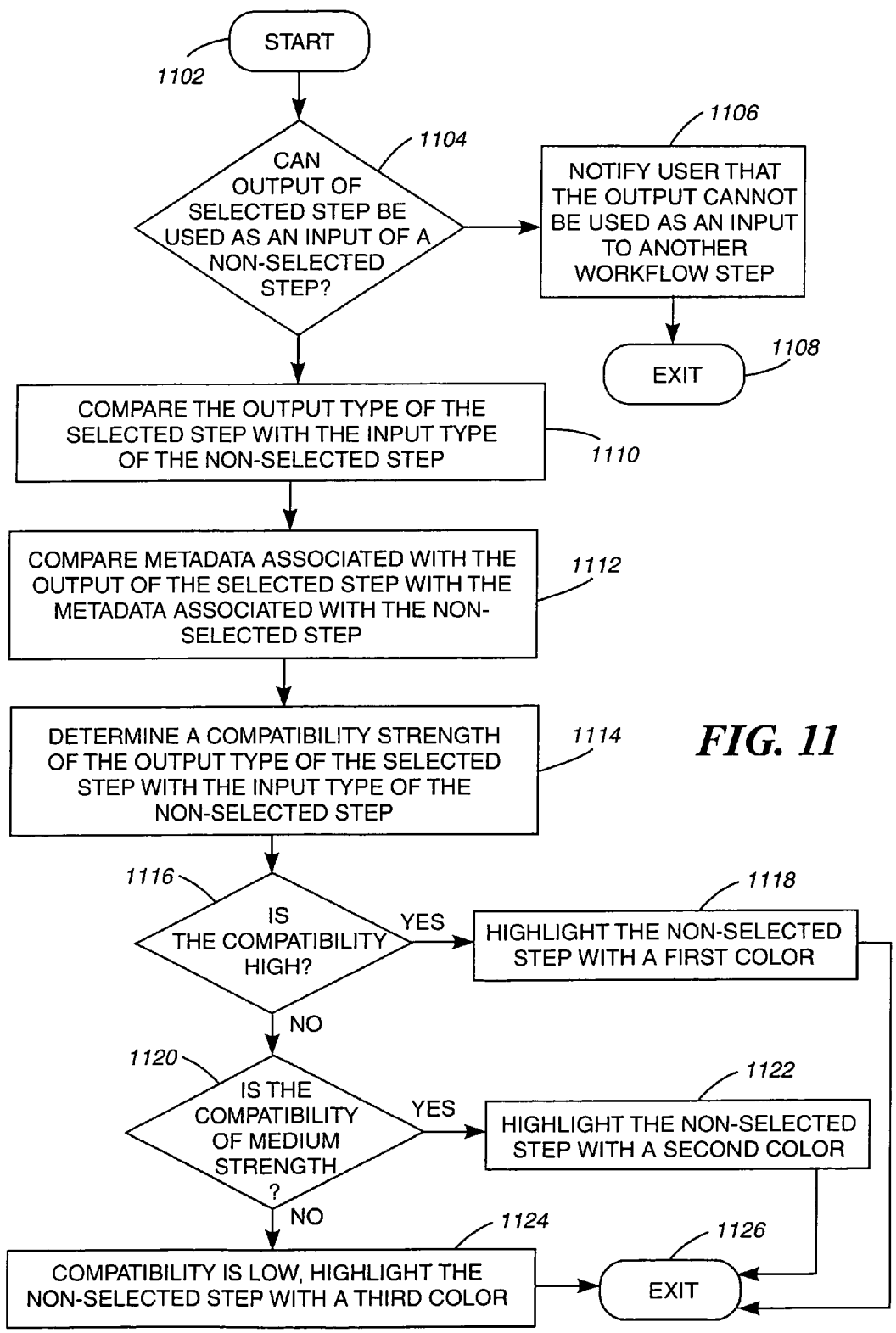
FIG. 11 is an operational flow diagram illustrating an exemplary process of a determining which workflow steps can accept an output of another workflow step according to an embodiment of the present invention.

Exemplary Process of Providing Workflow Management Through a Workflow User Interface FIG. 10 and FIG. 11 are operational flow diagrams illustrating an exemplary process of at providing graphical management of a workflow to a user through a workflow user interface 136. The operational flow diagram of FIG. 10 begins at step 1002 and flows directly to step 1004. The workflow user interface 136, at step 1004, graphically displays steps of a workflow. For example, the steps are displayed as boxes or any other shape, picture, icon, or the like. The user interface 136, at step 1006, receives a user's selection of at least one workflow step. For example, a user can user a mouse pointer to click on a box representing a workflow step thereby selecting it.

The output, at step 1008, of the selected step is analyzed to determine if it can be used as an input of at least one of the non-selected steps. If the result of this determination is negative, the user interface 136, at step 1010, displays a message to the user stating that the output of the selected workflow step cannot be used as an input of the non-selected steps. The control flow then exits at step 1012. If the result of this determination is positive, the non-selected workflow step, at step 1014, is graphically changed to indicate that it can accept the output of the selected step.

For example, in one embodiment, workflow steps are registered with the central storage system 112. This registration process tells the central storage system 112 the data types the workflow step provides and can accept. In one embodiment, when a user selects a workflow step through the user interface 136, a notification is sent to the central storage system 112. The central storage system notifies all the registered workflow steps that a selection of a certain data type has been made, and those workflow steps can visually change their user interface to show the user that they can either accept or not accept the selected data type. For example, the shape, icon, or picture representing the non-selected workflow step is changed, resized, shaded, or painted with a different color. The operational flow then exits at step 1016.

FIG. 11 illustrates a more detailed process of determining the compatibility of using an output of one workflow step as an input of another workflow step. The operational flow diagram of FIG. 11 begins at step 1102 and flows directly to step 1104. The output of a selected workflow step, at step 1104, is analyzed to determine whether it can be used as an input of a non-selected step. If the result of this determination is negative, the user, at step 1106, is notified that the output cannot be used as an input of another workflow step. The control flow then exits at step 1108. If the result of this determination is positive, the output type of the selected step, at step 1110, is compared with the input type of the non-selected workflow step. Also, metadata associated with the output of the selected workflow step, at step 1112, is compared with metadata associated with the input of the non-selected step. In one embodiment, connection precedence and metadata such as organization, author, license, and the like are compared.

A compatibility strength, at step 1114, is determined from the comparisons of steps 1110 and 1112 between the output of the selected step and the input of the non-selected step. If the compatibility is determined to be high, at step 1116, a connection line 502 between the output of the selected workflow step and the input of the non-selected step, at step 1118, is changed to a first color representing high compatibility. If the compatibility is determined to be medium, at step 1120, the connection wire 502, at step 1122, is changed to a second color representing medium compatibility. If the compatibility is determined to not be high or medium, the compatibility is low and the connection line 502, at step 1124, is changed to a color representing a low compatibility. The control flow then exits at step 1126.

Figure 12:
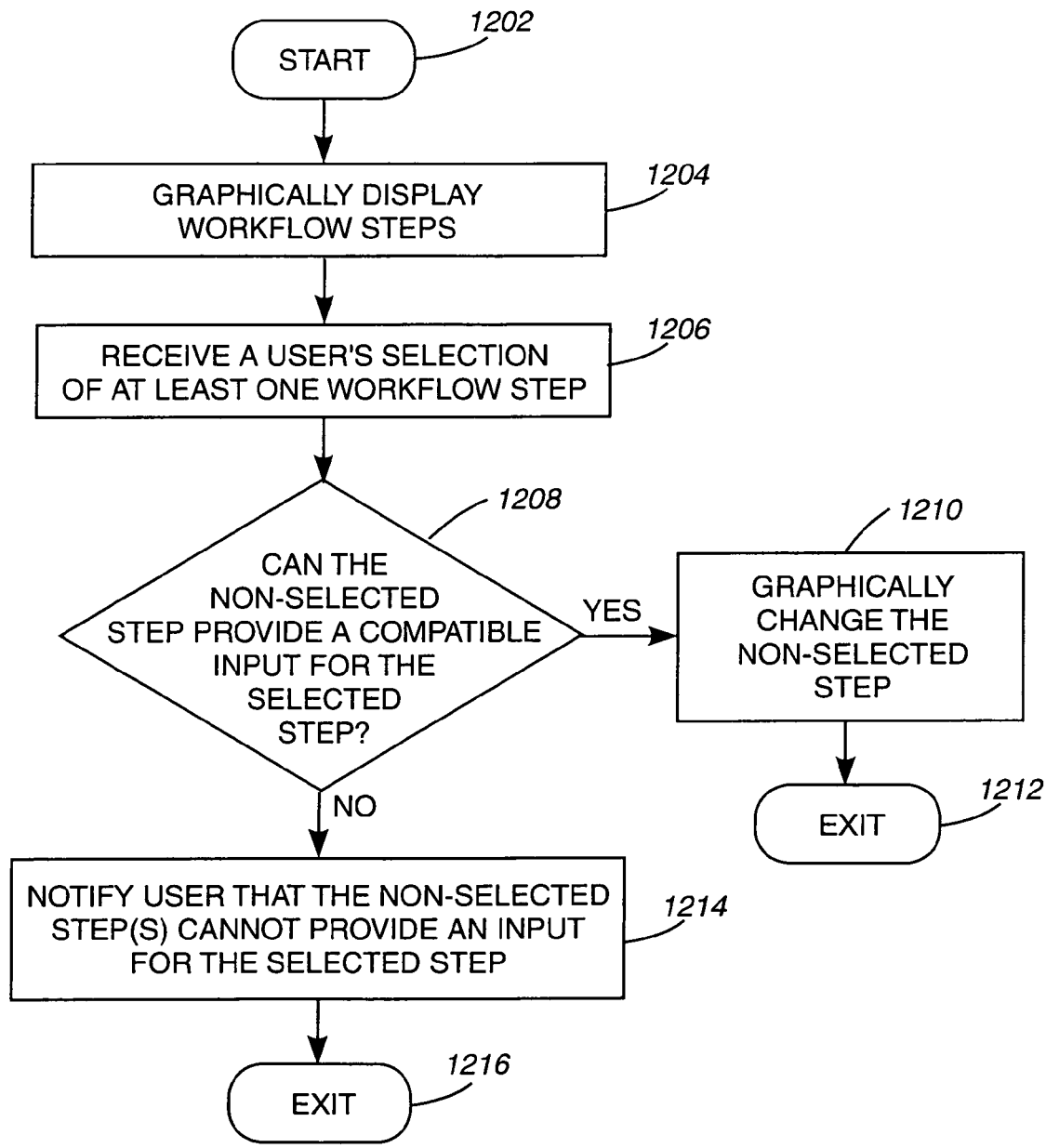
FIG. 12 is an operational flow diagram illustrating an exemplary process of a visually indication which workflow steps can provide a compatible input for the selected workflow step, according to an embodiment of the present invention.

Exemplary Process of Providing a Graphic Representation of Available Inputs for a Workflow Step FIG. 12 illustrates an exemplary process of graphically providing available inputs for a workflow step to a user through a workflow user interface 136. The operational flow diagram of FIG. 12 begins at step 1202 and flows directly to step 1204. The operational flow diagram of FIG. 12 begins at step 1202 and flows directly to step 1204. The workflow user interface 136, at step 1004, graphically displays steps of a workflow. For example, the steps are displayed as boxes or any other shape, picture, icon, or the like. The user interface 136, at step 1206, receives a user's selection of at least one workflow step. For example, a user can user a mouse pointer to click on a box representing a workflow step thereby selecting it.

The non-selected steps, at step 1208, are analyzed to determine whether the non-selected steps can provide an input to the selected step. If the result of this determination is positive, the non-selected step, at step 1210, is graphically changed to indicate that it can provide an input as discussed above with reference to FIG. 10 and FIG. 11. The control flow then exits at step 1212. If the result of this determination is negative, the user interface 136, at step 1214, notifies the user that none of the steps in the workflow can provide the selected step with an input. Alternatively, the description of FIG. 12 is also applicable when identifying which of the non-selected steps can accept the input of the selected step.

Non-Limiting Examples

The foregoing embodiments of the present invention are advantageous because they allow the orchestration a workflow in a non-centralized fashion. In other words, a single program is not continually orchestrating the workflow. Another advantage of the present invention is that a system can orchestrate workflows involving diverse types of processes in a highly distributed environment. For example, job steps involving high processing computer applications, web services, user applications, and laboratory equipment are able to be integrated and execute a workflow. The interaction of such different types of processes can be handled automatically by the workflow management system and special compatibility layers for the different types of processes are not needed.

Another advantage of the present invention is that a user is able to use a workflow user interface to manage a workflow. When a workflow step is selected all of the compatible steps that can accept its output or provide an input are automatically displayed. A user does not have to drag a workflow step over all the other workflow steps to find out which steps can accept the output of the selected step or provide an input to the selected step. The user interface provides a user with visual feedback or cues that help identify compatible inputs and outputs.

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Embodiments of the invention can be implemented as a program product for use with a computer system such as, for example, the computing environment shown in FIG. 1 and described herein. The program(s) of the program product defines functions of the embodiments (including the methods described herein) and can be contained on a variety of computer readable media. Illustrative computer readable medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for graphically presenting compatible workflow steps to a user through a graphical user interface, the method on an information processing system comprising:
   graphically displaying in a workspace a plurality of steps in a workflow that is to be performed across a plurality of distributed participants in a distributed processing environment, wherein a participant is at least one of an application, an information processing system, and a hardware set communicatively coupled to an information processing system for performing at least one of the steps in the workflow;
   receiving a user's selection for at least one step within the workspace in plurality of steps to denote at least one selected step and at least one non-selected step;
   determining if at least one of
      a set of one or more output parameters of the selected step is acceptable as an input of the non-selected step of the workflow and in response to the set of one or more output parameters of the selected step being acceptable, graphically changing an appearance of the non-selected step independent of a location distance between the selected step and the non-selected step within the workspace; and
      a set of one or more output parameters of the non-selected step is acceptable as an input of the selected step and in response to the set of one or more output parameters of the non-selected step being acceptable, graphically changing an appearance of the non-selected step independent of a location distance between the selected step and the non-selected step within the workspace;
   wherein the graphically changing the appearance comprises at least changing a color of a graphic representing the non-selected step, wherein the changing the color comprises:
      using different colors to indicate different types of compatibility and different strengths of compatibility between at least one of
         the output parameter of the selected step and an input acceptable by the non-selected step and
         the output parameter of the non-selected step and an input acceptable by the selected step.

2. The method of claim 1, wherein the graphically changing the appearance further comprises at least one of:
   resizing the graphic representing the non-selected step;
   shading the graphic representing the non-selected step; and
   representing the non-selected step with a new graphic.

3. The method of claim 1, wherein the strength of compatibility is based on at least one of:
   connection precedence;
   metadata between the selected step and the non-selected step; and
   a number of compatible connection matches.

4. A method for graphically presenting compatible workflow steps to a user through a graphical user interface, the method on an information processing system comprising:
   graphically displaying in a plurality of steps in a workflow that is to be performed across a plurality of distributed a workspace participants in a distributed processing environment, wherein a participant is at least one of an application, an information processing system, and a hardware set communicatively coupled to an information processing system for performing at least one of the steps in the workflow, and wherein each of the steps in the workflow are associated with a set of Resource Description Framework ontologies;
   receiving a user's selection for at least one step within the workspace in plurality of steps to denote at least one selected step and at least one non-selected step;
   determining if at least one of
      a set of one or more output parameters of the selected step is acceptable as an input of the non-selected step of the workflow and in response to the set of one or more output parameters of the selected step being acceptable, graphically changing an appearance of the non-selected step independent of a location distance between the selected step and the non-selected step within the workspace, and wherein the changing the appearance of the non-selected step comprises changing a color of an area within a border of a graphic representing the non-selected step, wherein the color is one of a plurality of colors each indicating different types of compatibility and different strengths of compatibility between the output parameter of the selected step and an input acceptable by the non-selected step; and
      a set of one or more output parameters of the non-selected step is acceptable as an input of the selected step and in response to the set of one or more output parameters of the non-selected step being acceptable, graphically changing an appearance of the non-selected step independent of a location distance between the selected step and the non-selected step within the workspace, and wherein the changing the appearance of the non-selected step comprises changing a color of an area within a border of a graphic representing the non-selected step, wherein the color is one of a plurality of colors each indicating different types of compatibility and different strengths of compatibility between the output parameter of the non-selected step and an input acceptable by the selected step.

* * * * *